(12) United States Patent
Wang et al.

(10) Patent No.: US 10,417,367 B2
(45) Date of Patent: Sep. 17, 2019

(54) SYSTEM FOR PLACEMENT OPTIMIZATION OF CHIP DESIGN FOR TRANSIENT NOISE CONTROL AND RELATED METHODS THEREOF

(71) Applicant: UNIVERSITY OF VIRGINIA PATENT FOUNDATION, Charlottesville, VA (US)

(72) Inventors: Ke Wang, Charlottesville, VA (US); Kevin Skadron, Charlottesville, VA (US); Mircea R. Stan, Charlottesville, VA (US); Runjie Zhang, Charlottesville, VA (US)

(73) Assignee: UNIVERSITY OF VIRGINIA PATENT FOUNDATION, Charlottesville, VA (US)

( * ) Notice: Subject to any disclaimer, the term of this patent is extended or adjusted under 35 U.S.C. 154(b) by 604 days.

(21) Appl. No.: 14/727,277

(22) Filed: Jun. 1, 2015

(65) Prior Publication Data

US 2015/0370944 A1 Dec. 24, 2015

Related U.S. Application Data

(60) Provisional application No. 62/004,915, filed on May 30, 2014.

(51) Int. Cl.
*G06F 17/50* (2006.01)

(52) U.S. Cl.
CPC ...... *G06F 17/5068* (2013.01); *G06F 17/5036* (2013.01); *G06F 17/5072* (2013.01); *G06F 2217/82* (2013.01)

(58) Field of Classification Search
CPC ............. G06F 17/5068; G06F 17/5072; G06F 17/5081; G06F 2217/78; G06F 2217/82; H01L 27/0207

See application file for complete search history.

(56) References Cited

U.S. PATENT DOCUMENTS

| | | | | |
|---|---|---|---|---|
| 2007/0271539 A1* | 11/2007 | Murray | ............ | G06F 17/5072 716/122 |
| 2008/0222579 A1* | 9/2008 | Agarwal | ............ | G06F 17/5036 716/136 |

OTHER PUBLICATIONS

Kim et al., "Automating Stressmark Generation for Testing Processor Voltage Fluctuations". IEEE Micro vol. 33, No. 4, pp. 66-75. Jun. 2013.*

(Continued)

*Primary Examiner* — Vuthe Siek
*Assistant Examiner* — Aric Lin
(74) *Attorney, Agent, or Firm* — Westerman, Hattori, Daniels & Adrian, LLP

(57) ABSTRACT

Transient voltage noise, including resistive and reactive noise, causes timing errors at runtime. A heuristic framework, Walking Pads, is introduced to minimize transient voltage violations by optimizing power supply pad placement. It is shown that the steady-state optimal design point differs from the transient optimum, and further noise reduction can be achieved with transient optimization. The methodology significantly reduces voltage violations by balancing the average transient voltage noise of the four branches at each pad site. When pad placement is optimized using a representative stressmark, voltage violations are reduced 46-80% across 11 Parsec benchmarks with respect to the results from IR-drop-optimized pad placement. It is shown that the allocation of on-chip decoupling capacitance significantly influences the optimal locations of pads.

6 Claims, 22 Drawing Sheets

(56) References Cited

OTHER PUBLICATIONS

Joshi et al., "Automated Microprocessor Stressmark Generation". HPCA 2008.*
Yu et al., "A novel and efficient method for power pad placement optimization". 14$^{th}$ International Symposium on Quality Electronic Design, Mar. 2013.*
Wang et al., "Walking pads: Fast power-supply pad-placement optimization". 19$^{th}$ Asian and South Pacific Design Automation Conference, Jan. 2014.*
International Technology Roadmap for Semiconductors, 2011.
C. Bienia et al., "The PARSEC Benchmark Suite: Characterization and Architectural Implications", In PACT, Oct. 2008, pp. 72-81.
N. Binkert et al., "The gem5 Simulator", ACM SIGARCH Computer Architecture News, vol. 39, No. 2, May 2011, pp. 1-7.
J. Chung, "Modeling and Hybrid Simulation of On-Chip Power Delivery Network Using an Unconditionally Stable Electromagnetic Field Solver", PhD thesis, UIUC, 2007.
G. G. Faust et al., "ArchFP: Rapid Prototyping of pre-RTL Floorplans", VLSI-SoC, Oct. 2012.
K. Haghdad et al., "Power Supply Pads Assignment for Maximum Timing Yield", IEEE Transactions on Circuits and Systems—II: Express Briefs, vol. 58(10):697-701, 2011.
ITRS, 2011, http://www.itrs.net.
A. Joshi et al., "Automated Microprocessor Stressmark Generation", In HPCA, Feb. 2008, pp. 229-239.
C. R. Lefurgy et al., "Active Management of Timing Guardband to Save Energy in POWER7", In MICRO 11, Dec. 3-7, 2011, pp. 1-11.
S. Li et al., "McPAT: An Integrated Power, Area, and Timing Modeling Framework for Multicore and Manycore Architectures", In MICRO, Dec. 12-16, 2009, pp. 469-480.
A. V. Mezhiba et al., "Electrical Characteristics of Multi-Layer Power Sistribution Grids", In ISCAS, May 2003, pp. V473-V-476.
T. Sato, H. Onodera, and M. Hashimoto. Successive pad assignment algorithm to optimize number and location of power supply pad using incremental matrix inversion. In ASP-DAC, Jan. 2005.
K. Wang et al., "Walking Pads: Fast Power-Supply Pad-Placement Optimization", In ASP-DAC, Jan. 2014, pp. 537-543.
R. E. Wunderlich et al., "SMARTS: Accelerating Microarchitecture Simulation via Rigorous Statistical Sampling", In ISCA, Jun. 2003.
T. Yu et al., "A Novel and Efficient Method for Power Pad Placement Optimization", In ISQED, Mar. 2013.
R. Zhang et al., "Architecture Implications of Pads as a Scarce Resource", In ISCA, Jun. 2014.
M. Zhao et al., "Optimal Placement of Power Supply Pads and Pins", DAC, Jun. 2004.
Y. Zhong and M. D. F. Wong, "Fast placement optimization of power supply pads", In ASP-DAC, Jan. 2007, pp. 165-170.
Kevin Skadron et al., "Temperature-Aware Microacrchitecture: Modeling and Implementation", ACM Transactions on Architecture and Code Optimization, vol. 1, No. 1, Mar. 2004, pp. 94-125.

* cited by examiner

Figure 5

Set: initial move distance $D_0$, freezing rate $\gamma$
repeat
    foreach grid $\in$ {GND, VDD} do
        Solve transient equation;
        foreach pad do
            $\vec{F} = (G_{north} - G_{south}, G_{east} - G_{west})$;
            $\vec{Disp} = \vec{F}/\|\vec{F}\| * D_i$;
            Move;
        end
        $D_{i+1} = D_i * \gamma$
        is_better();
    end
until is_converged() == True;

Figure 7

```
repeat
    Sort power pads by distance to noise hot spot → PadList;
    foreach pad ∈ PadList do
        $\vec{F} = (G_{north} - G_{south}, G_{east} - G_{west})$;
        Move pad to the neighboring candidate position in
        the direction of $\vec{F}/\|\vec{F}\|$;
        Solve transient equation, identify hot spot;
        if is_better() then
            | accept the movement; break;
        else
            | undo the movement;
        end
    end
until is_converged() == True;
```

SYSTEM FOR PLACEMENT OPTIMIZATION OF CHIP DESIGN FOR TRANSIENT NOISE CONTROL AND RELATED METHODS THEREOF

RELATED APPLICATION

This application claims priority to U.S. Provisional Application No. 62/004,915, "System for Placement Optimization of Chip Design for Transient Noise Control and Related Methods Thereof," filed May 30, 2014, which application is incorporated by reference herein in its entirety.

STATEMENT OF FEDERALLY SPONSORED RESEARCH/DEVELOPMENT

This invention was made with government support in part by NSF grant CCF 1255907 and C-FAR, one of six centers of STARnet, a Semiconductor Research Corporation program sponsored by MARCO and DARPA. The government has certain rights in the invention.

BACKGROUND

The exponential growth in on-chip power and current density due to CMOS scaling leads to two major challenges in the physical design of electronic devices. Including processors and memory: 1) delivering a stable voltage supply to the electronics; 2) managing heat transfer to avoid high temperature of electronic devices. When the supply voltage deviates too significantly from the nominal, timing errors can occur. When temperature becomes too high at some location of a device, the device cannot function properly and its life time is dramatically shortened.

The components of an electronic device can only function properly under a given range of voltage supply and temperature. Variation in the voltage supply beyond the allowed range is called voltage supply noise. Temperature in excess of the allowed range is called temperature violation. Voltage supply noise occurs due to the electrical resistance, electrical capacitance, and electrical inductance of the components of the power delivery network (PDN), such as the package, the controlled-collapse-chip-connection (C4) pads that connect the package to the PDN, and the PDN wires themselves. Recent studies show that transient inductive noise, proportional to instant current change (di/dt) and electrical inductance, is expected to represent a larger proportion of total noise in future process technologies (Documents 1 and 12).

Both voltage supply noise and temperature violators are sensitive to the allocations of the power pads, the transistor-cells, the decoupling capacitors (decaps), or other electrical units. In the disclosed embodiments, the effect of C4 power supply pad allocation on transient voltage noise is explored. As the interface between the package and the chip, C4 pads play a crucial role in determining the impedance of the whole power delivery system. C4 pads are used for both power delivery and I/O; while allocating additional C4 pads for power delivery can minimize voltage noise, doing so may reduce available I/O bandwidth, because C4 pads are a scare resource. Optimizing power pad count and placement, beyond improving stability or performance by reducing voltage noise, also exposes opportunities to increase I/O bandwidth, a critical bottleneck in modern SoC design.

Prior work has targeted resistive voltage noise (also called IR drop) and optimized pad location and number to minimize worst-case IR drop (Documents 13, 14, 16, 18, and 19). All these state-of-the-art pad placement techniques focus only on steady-state analysis and VDD pads. While previous work (Document 16) suggests reducing transient noise with IR-based-optimization, it is observed that such optimization has limited benefit.

Pad placement optimization for transient noise mitigation is characterized by an enormous design space combined with costly design evaluation. First, computationally complex architectural modeling is required to derive the voltage violations needed to determine optimal pad location. VoltSpot (Document 17), for instance, calculates grid node voltage at a sub-cycle granularity in order to achieve the fidelity needed for accurate, transient PDN behavior modeling. Second, the combinatorial design space of pad placement is huge for modern chips, consisting of over 1,000 candidate pad locations, of which typically 50% or more are used for power delivery. For example, the search space for the case study—a 16 nm, 16-core Intel Penryn-like multiprocessor—is larger than $10^{489}$.

To make transient noise mitigation tractable, Walking Pads (WP), a heuristic optimization framework for fast IR-drop-optimized power pad placement is extended (Document 14). WP converts the global pad placement optimization problem into a local virtual-force balance problem allowing simultaneous movement of all pads, reducing algorithm complexity significantly over the simulated annealing (SA) and mixed integer linear program (MILP) approaches in the literature (Documents 18 and 19). The computational efficiency of WP makes VDD and GND pad placement optimization for transient violation suppression feasible. To ensure WP selects a pad placement suitable across many real-world programs (benchmarks), and thus, many PDN behaviors, optimizing placement using a benchmark representative of worst-case transient power supply behavior under a continuous execution segment of a benchmark program, a "stressmark" is proposed. This is a benchmark exhibiting extreme behavior to stress the limits of a design.

According to electrical-thermal duality, the power supply and heat transfer follow the similar physical laws and mathematical formula (Document 20). The proposed method is also applicable to improve thermal control of the electronic devices.

Document List:

Document 1: International technology roadmap for semiconductors, 2011.

Document 2: C. Bienia et al. The PARSEC benchmark suite: Characterization and architectural implications. In PACT, Oct. 2008.

Document 3: N. Binkert et al. The gem5 simulator. SIGARCH Comput. Archit. News, Aug. 2011.

Document 4: J. Chung. Modeling and Hybrid Simulation of On-chip Power Delivery Network Using an Unconditionally Stable Electromagnetic Field Solver. PhD thesis, UIUC, 2007.

Document 5: G. G. Faust et al. ArchFP: rapid prototyping of pre-RTL floorplans. In VLSI-SoC, Oct. 2012.

Document 6: K. Haghdad and M Anis. Power supply pads alignment for maximum timing yield. IEEE Trans. Circuits Syst. II, Exp. Briefs2; 58(10):697-701,2011.

Document 7: ITRS. 2011. http://www.itrs.net.

Document 8: A. Joshi et al. Automated microprocessor stressmark generation. In HPCA, Feb. 2008.

Document 9: C. R. Lefurgy et al. Active management of timing guardband to save energy in POWER7. In MICRO. Dec. 2011.

Document 10: S. Li et al. McPAT: an integrated power area, and timing modeling framework for multicore and manycore architectures. In MICRO, Dec. 2009.

Document 11: A. V. Mezhiba and E. G. Friedman. Electrical characteristics of multi-layer power distribution grids. In ISCAS, May 2003.

Document 12: M. Popovich et al. Power distribution networks with on-chip decoupling capacitors. Springer, New York, 2008.

Document 13: T. Sato, H. Onodera, and M. Hashimoto. Successive pad assignment algorithm to optimize number and location of power supply pad using incremental matrix inversion. In ASP-DAC, Jan. 2005.

Document 14: K. Wang et al. Walking pads: Fast power-supply pad-placement optimization. In ASP-DAC, Jan. 2014.

Document 15: R. E. Wunderlich et al. SMARTS; accelerating microarchitechure simulation via rigorous statistical sampling. In ISCA, Jun. 2003.

Document 16: T. Yu and M. Wong. A novel and efficient method for power pad placement optimization, In ISQED, Mar. 2013.

Document 17: R. Zhang et al. Architecture Implication of Pads as a Scarce Resource. In ISCA. Jun. 2014.

Document 18: M. Zhao et al. Optimal placement of power supply pads and pins. In DAC, Jun. 2004.

Document 19: Y. Zhong and M. D. F. Wong. Fast placement optimization of power supply pads. In ASP-DAC, Jan. 2007.

Document 20: K. Skadron et al. "Temperature-aware microarchitecture: Modeling and Implementation," ACM Trans. Archit. Code Optim., vol. 1, 2004, p. 94-125.

SUMMARY

In accordance with some embodiments, an electrical unit (component) placement optimization framework for transient voltage and temperature control on electronic devices is provided. This method and related system gathers the information of physical quantities (e.g. current, resistive voltage drops, reactive voltage drops, a summation of the resistive voltage drops and the reactive voltage drops, spatial gradients of the resistive voltage drops, spatial gradients of the reactive voltage drops, heat fluxes, local temperature changes, and spatial temperature gradients) from a physical spatial-temporal simulation of voltage or temperature distribution on electronic devices. To reduce the computation cost, the information of physical quantities, e.g. voltage, temperature, is observed in a plurality of program execution segments in a time domain or a frequency domain. The transient information of physical quantities is translated into metrics of local instability of the system by averaging these physical quantities over the period of time of program execution or over a range of frequency. By using the transient noise information (transient noise means transient instability behavior, e.g. voltage drop, temperature change), a virtual-force-directed placement strategy is developed to convert the interesting global optimization problem of power supply or temperature stability problem to a local balance problem of equalizing local virtual force imposed on the device components or units. Within this framework, two algorithms—practical optimization (PO) and deep optimization (DO)—are proposed to meet various requirements of optimization quality and speed. These two algorithms (e.g., method, technique and approaches) allow fine tuning results by prioritizing the objective functions of different metrics. The resulting noise reduction for whole benchmarks is far superior to that achieved from steady-state based placement method. This method and related system is able to capture transient properties of the system.

In accordance with some embodiments, a C4 pad placement optimization framework for transient noise control on power delivery grids is proposed. This method and related system implements a statistical sampling method to generate samples from execution traces of real-world benchmarks and selects representative execution segment as an input of optimization. This method and related system further reduces computation cost by converting a global optimization problem of pad placement for transient violation count minimizing to a local balance problem of equalizing transient noise metrics on the wires connected to pads. The transient noise metrics are obtained by averaging voltage noise crossing the representative program execution segment. To move pads to their local balance positions, a virtual-force-directed pad-movement strategy is adopted. The virtual force is defined as the mathematical function of the transient noise metrics. Within this framework, two algorithms—practical optimization (PO) and deep optimization (DO)—are proposed to meet various requirements of optimization quality and speed. These two algorithms (e.g., method, technique and approaches) allow fine tuning results by prioritizing various metrics of transient noise: global violation count, local violation count, and global violation amplitude. The reuniting noise reduction for whole benchmarks is far superior to that achieved from steady-state IR-drop based pad placement. This method is able to optimize placement of various electrical units including C4, transistor cell, decap and electrical unit, against transient noise of PDN or temperature violation.

In accordance with some embodiments, an electrical unit (component) placement optimization method for transient voltage and temperature control of electronic devices is disclosed. Still more particularly, power pad placement optimization method of power delivery networks (PDN), which is important, in computer-automated-design (CAD) of integrated circuits for transient voltage noise control is disclosed.

There is no previous work of placement optimization for transient noise control. A major reason is that transient simulation of PDN is very time consuming (1 month or longer). Another major reason is that the computation complexities of the existing optimization algorithms are very high and therefore always involve thousands to millions transient simulation iterations.

In accordance with some embodiments, the following three-level computation-complexity reduction strategy that, among ether things, is discussed:

1) Uses sampling technique to generate the samples of short execution, segments (e.g. 100-10000 device clock cycles) from each benchmark of real-world program.

2) Selects a representative sample among all samples of all benchmarks as the input of optimization algorithm.

3) Provides a heuristic efficient optimization method and related system that is developed to further reduce the optimization iterations.

In accordance with some embodiments, an optimization method and related system converts the global optimization problem of pad placement for transient violation count minimizing to a local balance problem of equalizing transient voltage noise on the wires connected to pads. The transient voltage noise is defined as voltage drop across a wire at a given cycle. This method and related system adopts a virtual-force-directed pad-movement. The virtual forces are calculated by averaging transient voltage noise occur on the wires connected to each pad crossing the representative execution segment of benchmark programs.

In accordance with some embodiments, an optimization method and related system that achieves significant speedup over other approaches, and therefore provides, but not limited thereto, two significant advantages:

1) An optimization method and related system that uses transient voltage noise occur around power pads to quickly identify promising pad locations.

2) A method and related system that allows all pads to step toward their noise-balanced positions simultaneously.

Because of the similarities of physical properties and mathematical descriptions of the described voltage-noise-suppression pad placement problem to other related electrical units placement problem, the algorithms (e.g., method, technique and approaches) described in this disclosure can be extended to transistor cell placement decoupling capacitors placement, thermal-aware chip design, electrical unit floorplanning and related through-silicon via (TSV) optimization on 3D IC.

In accordance with some embodiments, a number of products and services, such as but not limited thereto, power deliver network design; CAD-tools, etc, may be utilized.

BRIEF DESCRIPTION OF THE DRAWINGS

For a better understanding of the aforementioned embodiments of the invention as well as additional embodiments thereof, reference should be made to the Description of Illustrative Embodiments below, in compunction with the following drawings in which like reference numerals refer to corresponding parts throughout the figures.

FIG. 5 illustrates a pseudo-code for practical optimization algorithm in accordance with some embodiments.

FIG. 7 illustrates a pseudo-code for deep optimization algorithm in accordance with some embodiments.

DESCRIPTION OF ILLUSTRATIVE EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Problem Formulation

The objective of power supply pad location optimization is, given a) an architectural-block system floorplan, b) a cycle-by-cycle system power trace for each architectural block, c) the number of power supply pads to place, and d) the voltage violation threshold (any cycle with a larger voltage drop is considered to be a violation cycle), to identify the set of candidate pad locations at which to place power supply pads in order to minimize the number of transient violation cycles.

Power Delivery Network Modeling

Figure 1:
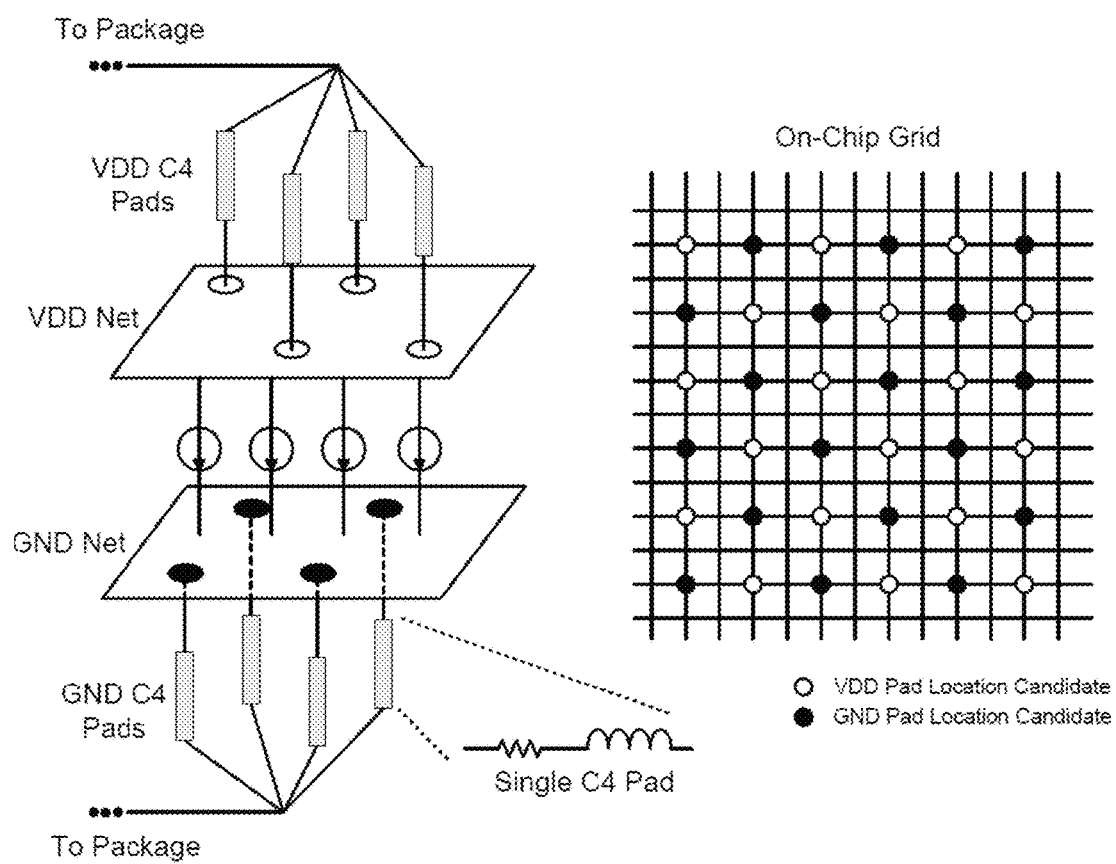
FIG. 1 illustrates on-chip power delivery network (PDN) model of atypical processor in accordance with some embodiments.
Figure 2:
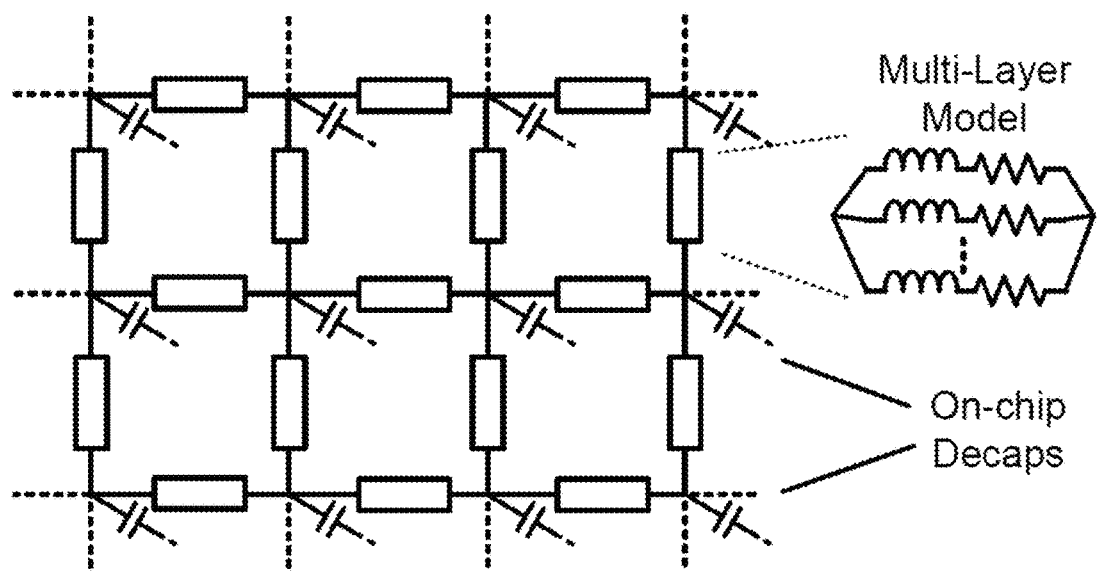
FIG. 2 illustrates on-chip grid model of a PDN in accordance with some embodiments.
Figure 3:
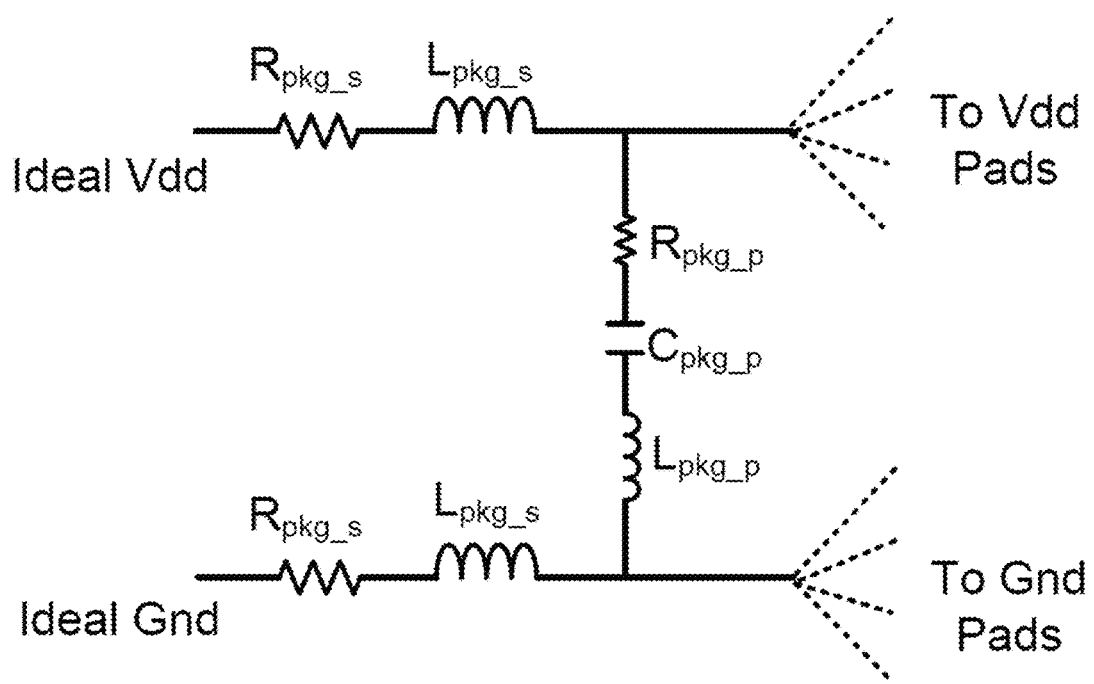
FIG. 3 illustrates package model of a PDN in accordance with some embodiments.

To capture the transient noise at architectural blocks in the PDN system, VoltSpot, an architectural level PDN model, is utilized (Document 17). As shown in FIGS. 1-3, this model includes two major parts: a model of the on-chip power delivery grid, and a model of the package. The VDD and GND nets are modeled as separate regular 2D circuit meshes. To accurately model the number of C4 pads and their locations, a 4-to-1 grid-node-to-pad ratio (i.e., using a 100×100 grid, to model a PDN with 50x=pads) is used (Document 17). Multiple RL pairs ("R" means the resistance of a wire; "L" means the inductance of a wire) to model multiple on-chip tibial metal layers used to conduct accurate simulation results (Document 11). C4 (controlled collapse chip connection) pads are modeled as individual resistor-inductor branches attached to on-chip grid nodes. On-chip decoupling capacitors connect to each VDD and GND grid node. Ideal current sources are used to model the load (i.e., the power of the switching transistors and associated leakage). A lumped RLC model for off-chip components such as the package or PCB board is used. The VoltSpot PDN model has been validated with IBM transient power grid benchmarks with a maximum error of 0.8% VDD voltage (Document 17).

The implicit trapezoidal numerical method to solve such large-scale circuits efficiently and accurately is employed (Documents 4 and 17). The time step to one fifth of a cycle at 3.7 GHz to keep the numerical error of node voltage below $10^{-5}$ V is set.

Power Supply Pad Placement

While steady-state voltage noise optimization can focus on VDD pads only (Documents 6, 16, and 19), transient voltage violation minimization requires the joint modeling/optimization of VDD and GND pads to correctly simulate the package-pad-mesh-pad-package circuit. To simplify the problem, the pad grid is divided into "white" and "black" (like a checkerboard) positions for VDD and GND pad candidate positions respectively, as illustrated in FIG. 1. Each possible allocation of VDD and GND pads to grid locations is called a configuration. The total number of configurations is larger than $10^{489}$ in the case studies. Checkerboard VDD-GND pad layout is not a limitation of the Walking Pads optimization framework. WP works as long as VDD and GND pad candidate positions are uniformly distributed.

Sampling and Selecting of Representative Segment

The power trace samples are generated by sampling instructions of whole benchmarks at equal intervals. The cycle segment (with the same meaning of program execution segment) with highest violation count is selected as representative cycle segment. Other methods of sampling and selecting representative segment are also possible under the optimization framework in accordance with some embodiments.

Theoretical Basic of Pad Placement Optimization Method for Transient Noise Control Walking Pads (WP) is based on the hypothesis that, when all pads are at their locally noise-balanced positions, with equal voltage noise along wires in two opposite directions from each pad, global voltage noise will be minimized. In other words, if a noise-balanced pad in any direction is moved, it will cause more noise in the opposite direction. The total current and total di/dt (inductive voltage drop) are both invariant in any given cycle, independent of pad placement; balancing noise by moving the pad toward higher noise will trade less noise in one area for more noise in another. However, if this balancing reduces the magnitude of the noise events such that they more often fall below the provisioned threshold, without pushing events elsewhere above the threshold, then the total noise is greatly decreased. Consequently, the WP framework is designed to convert a global optimization problem, the placement of a VDD and n GND pads given m≥2n candidate locations, into a local balance problem, the placement of individual pads with respect to various nearby voltage noise demands. To determine how to place pads, a virtual-force-directed pad movement strategy is developed; this virtual force is defined by a vector in the direction of the combined transient voltage noise observed by a given pad.

Algorithm Framework

Figure 4:
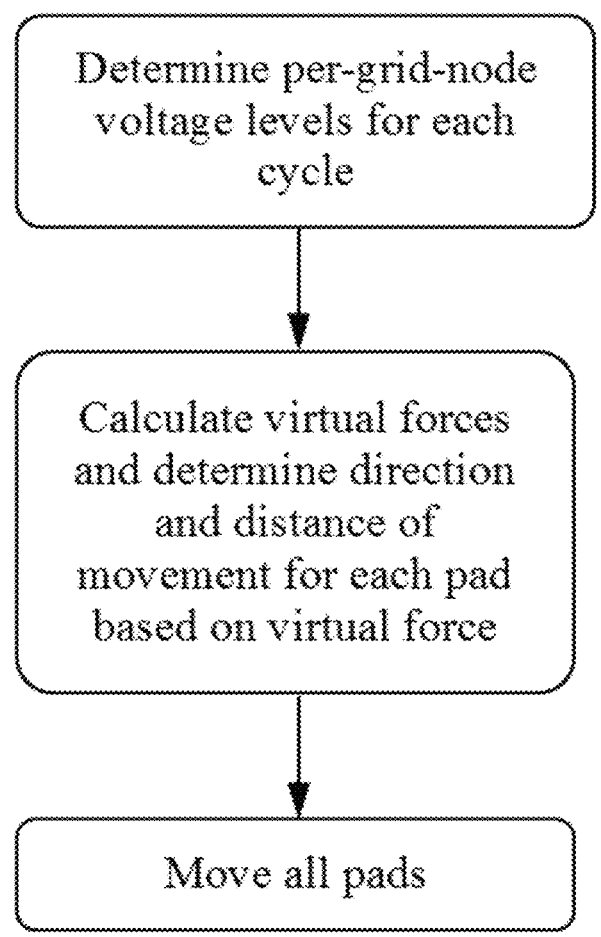
FIG. 4 is a flow diagram illustrating a general three-step optimization algorithm framework in accordance with some embodiments.

Walking Pads adopts a general three-step algorithm framework to incrementally move all pads toward their noise-balanced positions: (1) determine per-grid-node voltage levels for each cycle; (2) calculate virtual forces and determine the direction and distance of movement for each pad based an the virtual force; and, (3) move all pads. In step 1, transient PDN simulation is performed by simulating with power traces derived from activity factors calculated by a performance simulator. In step 2, for each pad, the transient voltage gradient along each wire from that pad (the rate of voltage change along the wire from the pad to an adjacent grid node) is averaged over all simulated cycles. The virtual force is then calculated by vector summation of the transient voltage gradient across the four wires connected to each pad. Noise in opposite directions in the grid from the pad cancels each other; when local noise is balanced, this vector is $\ddot{0}$. FIG. 4 is a flow diagram illustrating the general three-step algorithm framework.

When averaging the per-wire voltage gradient, three different strategies are tried: median, mean, and root mean square (RMS) of the voltage gradient. It is observed that the RMS results in the most effective noise minimization among the three approaches, because RMS can also capture the AC component of voltage noise. RMS is adopted.

A significant performance improvement over other methods like simulated annealing (SA) is achieved by (a) employing a deterministic approach to pad movement in step 2, and (b) allowing all pads to move simultaneously in step 3. As all pads move toward their estimated balanced positions in each iteration, less iterations are needed than in approaches that move fewer pads at once.

Virtual Force Calculation

The virtual force is defined by a vector in the direction of the total average voltage noise observed by a given pad. The voltage noise on one wire is defined as the voltage gradient occurs on that wire. The virtual force-for a pad on one direction is calculated by averaging voltage gradient on the connected wire from that direction over all cycles of target power trace. The total average voltage noise on one pad is the vector summation of average voltage noises from four directions. The total virtual force on one individual pad pulls that pad to the direction it points when moving that pad.

The algorithm (e.g., method, technique and approaches) described in the enclosed Appendix A are specific implement of the optimization framework proposed in this disclosure regarding aspects of various embodiments of the present invention, which use the total voltage noise (resistive noise—IR and reactive noise—Ldi/dt) to calculate virtual force and use root-mean-square method to average noise. However, it is also possible to define voltage noise in other ways, for example resistive noise only (only consider current) or reactive noise only (only consider di/dt). And, it is also possible to average noise with other averaging methods.

Other definitions of voltage noise and other averaging methods are all works fine with the optimization framework proposed in accordance with some embodiments. In addition to the pad placement problem, other placement problem of other electrical units also can be solved in the optimization framework proposed in accordance with some embodiments. The optimization framework proposed in accordance with some embodiments is also applicable to thermal-aware physical design of the electronic device by calculating virtual force with thermal related physical quantities, e.g. heat flux, temperature.

Algorithm Variants

Figure 6:
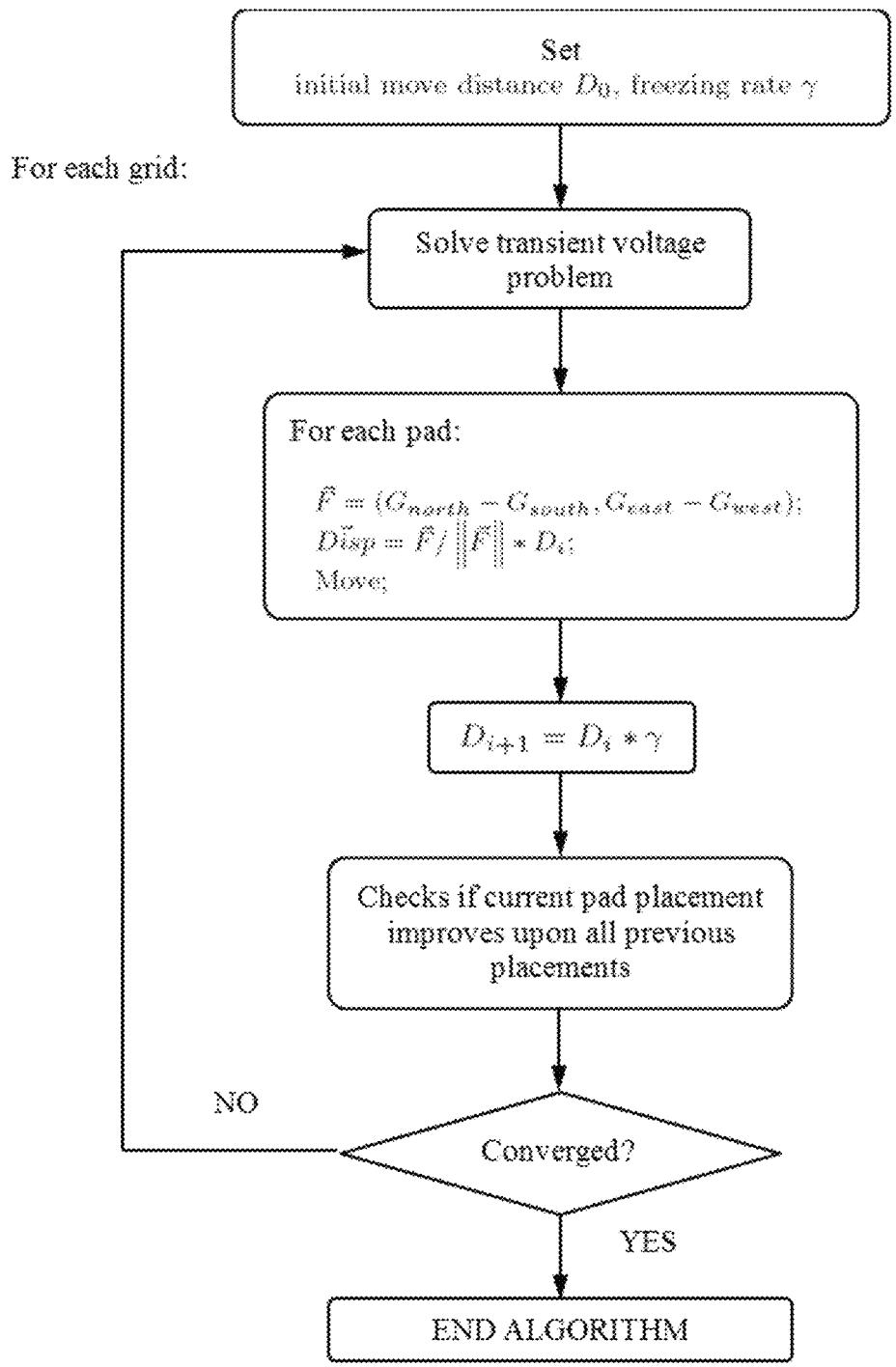
FIG. 6 is a flow diagram illustrating practical optimization algorithm in accordance with some embodiments.

"Practical" optimization, which trades lower results quality for faster optimization, is shown in FIG. 5. FIG. 6 is a flow diagram illustrating the practical optimization. PO moves pads in the direction defined by the normalized virtual force $\vec{F}/\|\vec{F}\|$. $\vec{F}$ is a function of $G_{dir}$, the average voltage noise in direction dir. To force pads to stop at approximately balanced positions, a "freezing" process is introduced, which gradually decreases the move distance $D_i$ of each pad at a constant freezing rate γ. PO terminates when pads no longer move. Since $D_i$ is a real number, pads move to the nearest unoccupied candidate position of the same type. The initial large-step stage of PO helps pads to jump out of local minima, while the later small-step stage helps pads gradually converge into balanced positions. One round of optimization of either GND pads or VDD pads is called an iteration, as each requires the most time-consuming part of the algorithm: solving the transient voltage equation. Pads from the GND and VDD grids move in alternating iterations, VDD and GND pads can be moved simultaneously, halving the required iterations, but resulting in up to 3% more voltage noise count in case studies. The faction is_better( ) checks if the current pad placement improves upon all previous placements. Three criteria are used to compare different pad placements. First, the placement with the fewest violation cycles is the best (better global violation-count optimization). In the event of a tie, the placement with the fewest violation cycles in the grid node with the maximum violation cycles is the best (better local violation-count optimization). In the event of a tie, the placement with the lowest maximum noise amplitude is the best (better global violation-amplitude optimization). Using these criteria, the best pad placement configuration is returned to the designer after PO converges.

All initial pad locations for PO are generated randomly, and the initial location has little effect on the resulting quality of PO. Using criteria described in Document 14, an initial move distance $D_0=3\sqrt{2}\times$pad pitch and freezing rate γ=0.99 are chosen for case studies. The strategy of automatic or adaptive parameter selection is also applicable within the proposed algorithm framework.

Figure 8:
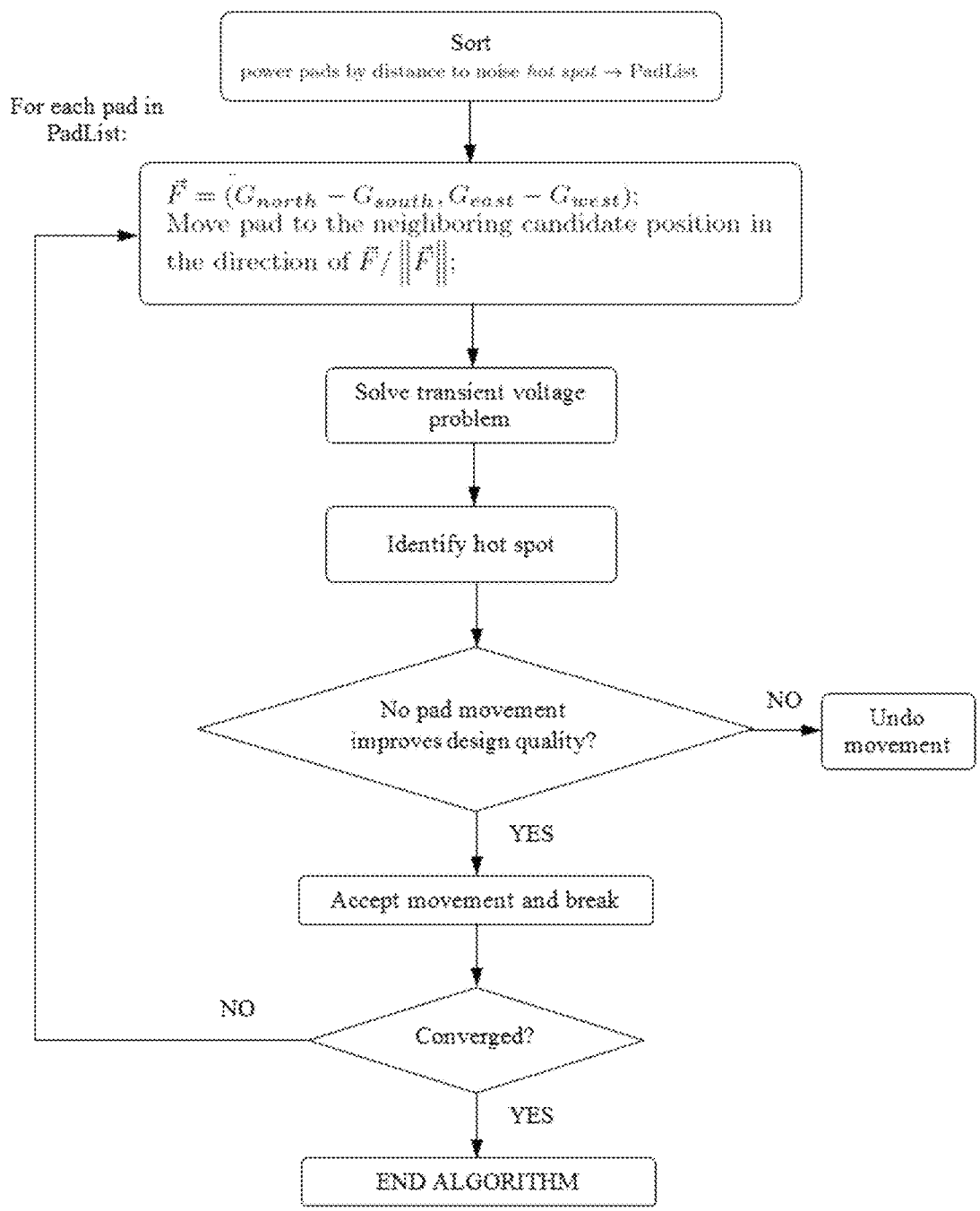
FIG. 8 is a flow diagram illustrating deep optimization algorithm in accordance with some embodiments.

"Deep" optimization which sacrifices performance for better violation suppression, is shown in FIG. 7. FIG. 8 is a flow diagram illustrating the deep optimization. Simultaneous pad movements (as in PO) reduce the quality of the solution to some extent because the forces on one pad may change when other pads move. To address this, DO performs a local greedy search: it moves one pad in each iteration and only accepts movements that improve solution quality. It is hypothesized that moving the pads nearest to the grid node with the highest violation count and amplitude (the hot spot) is the best way to quickly improve solution quality. DO sorts the VDD and GND pads by their distances to the hot spot and lets nearby pads (whether VDD or GND) move first. When the hot spot moves, DO re-sorts the pads and continues. DO terminates when no pad movement improves design quality as measured by is_better( ). To reduce search time, DO is only used after PO (noted PO+DO) when high-quality optimization is required.

Performance Comparison With Other Optimization Technique

The above algorithms are compared with steady-state IR-drop-optimizing simulated annealing (SA), because transient optimization using SA is impractical (too many costly iterations). To evaluate the feasibility of SA-based transient optimization, noise violations observed during one sample trace (the sample with the highest violation amplitude across all benchmarks, denoted "stressmark") are used to place 267 VDD and 267 GND pads over a 16-core model PDN described above. One PO/DO iteration or one SA trial movement causes one round of PDN transient simulation, requiring one minute of computation. PDN transient simulation is the most time consuming operation in pad placement optimization, requiring over 99.99% of the total optimization time across all evaluated methods.

Figure 9:
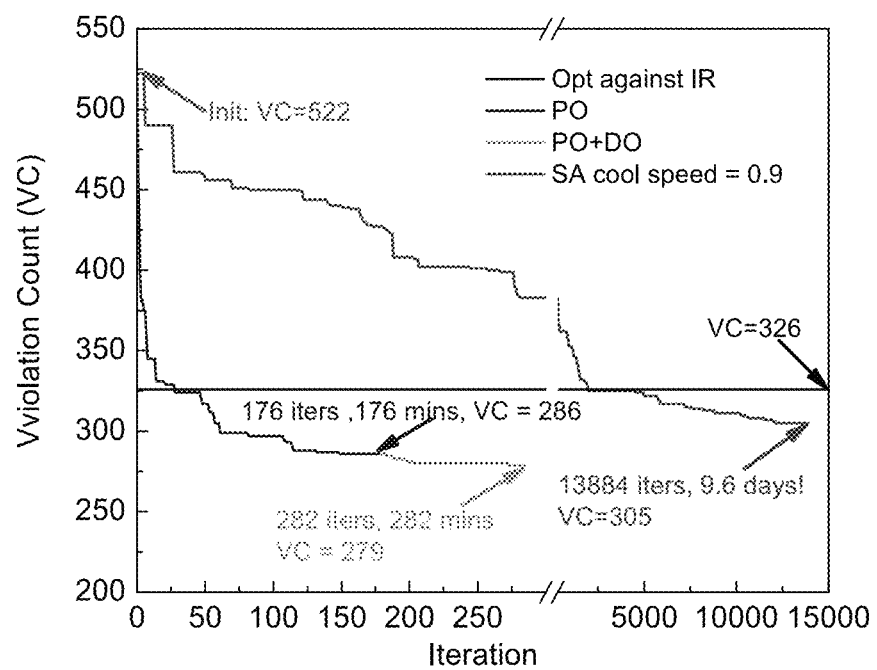
FIG. 9 illustrates computation time comparison between the simulated annealing and the algorithms (PO and DO) in accordance with some embodiments.
Figure 10:
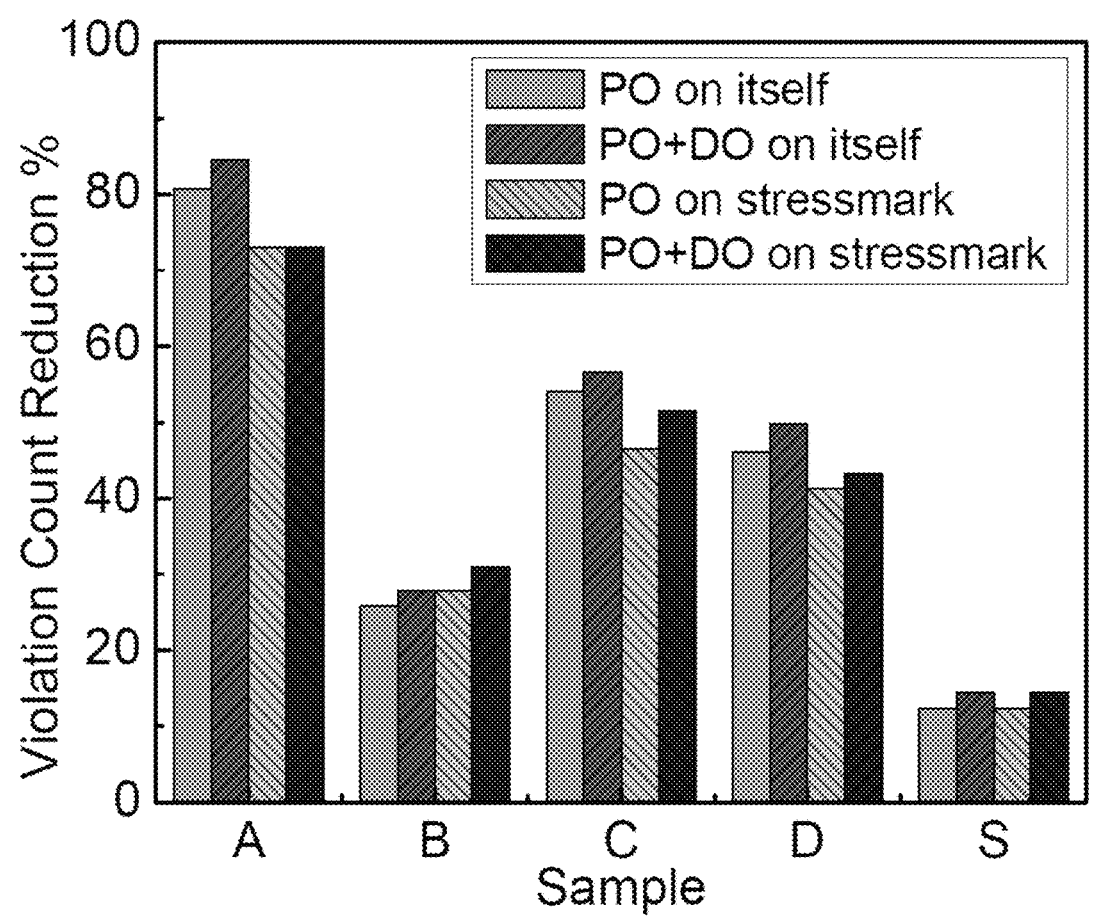
FIG. 10 illustrates effect of transient optimization on violation count with 267 VDD power pads (VDD means the entry points of power distribution network with high voltage) and 267 GND (GND means the entry points of power distribution network with low voltage) power pads in accordance with some embodiments. Here, "on itself" means optimizing pads and evaluating violation count on this sample, and "on stressmark" means optimizing pads on stressmark and evaluating violation count on this sample.
Figure 11:
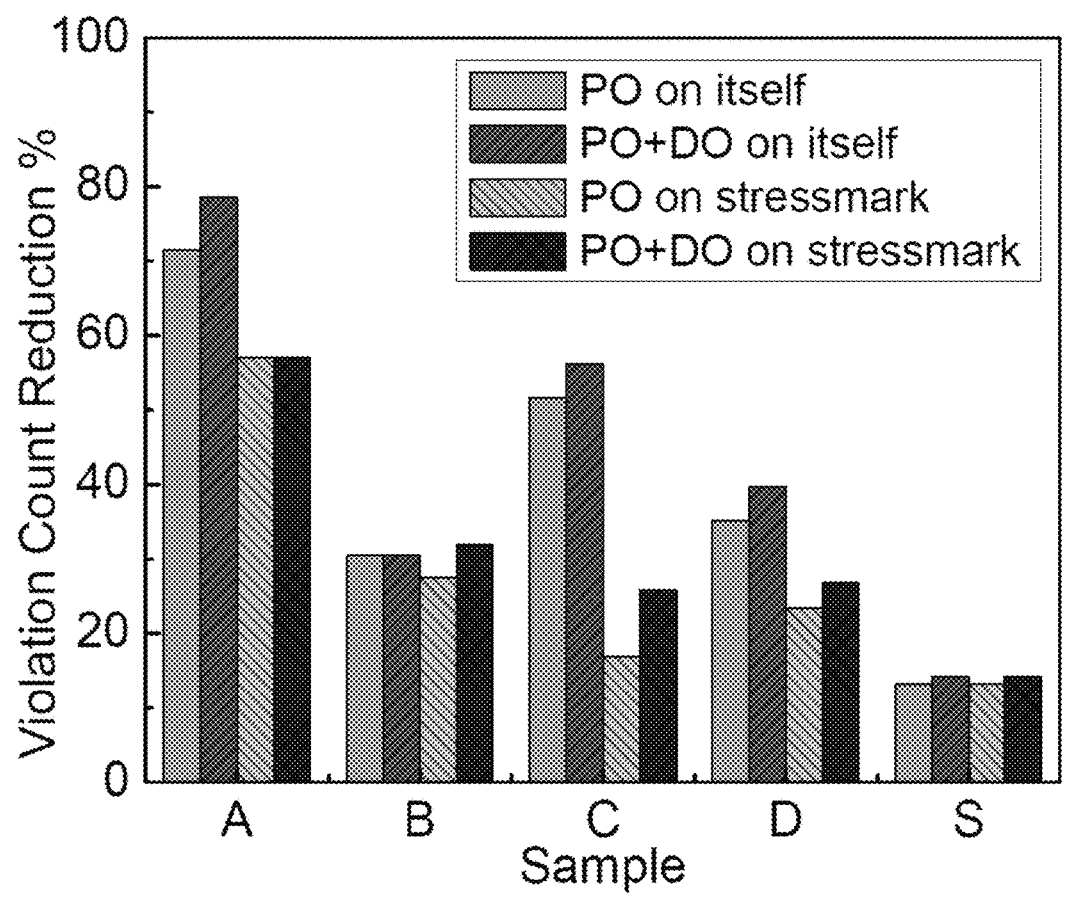
FIG. 11 illustrates effect of transient optimization on violation count with 387 VDD power pads and 387 GND power pads in accordance with some embodiments.
Figure 12:
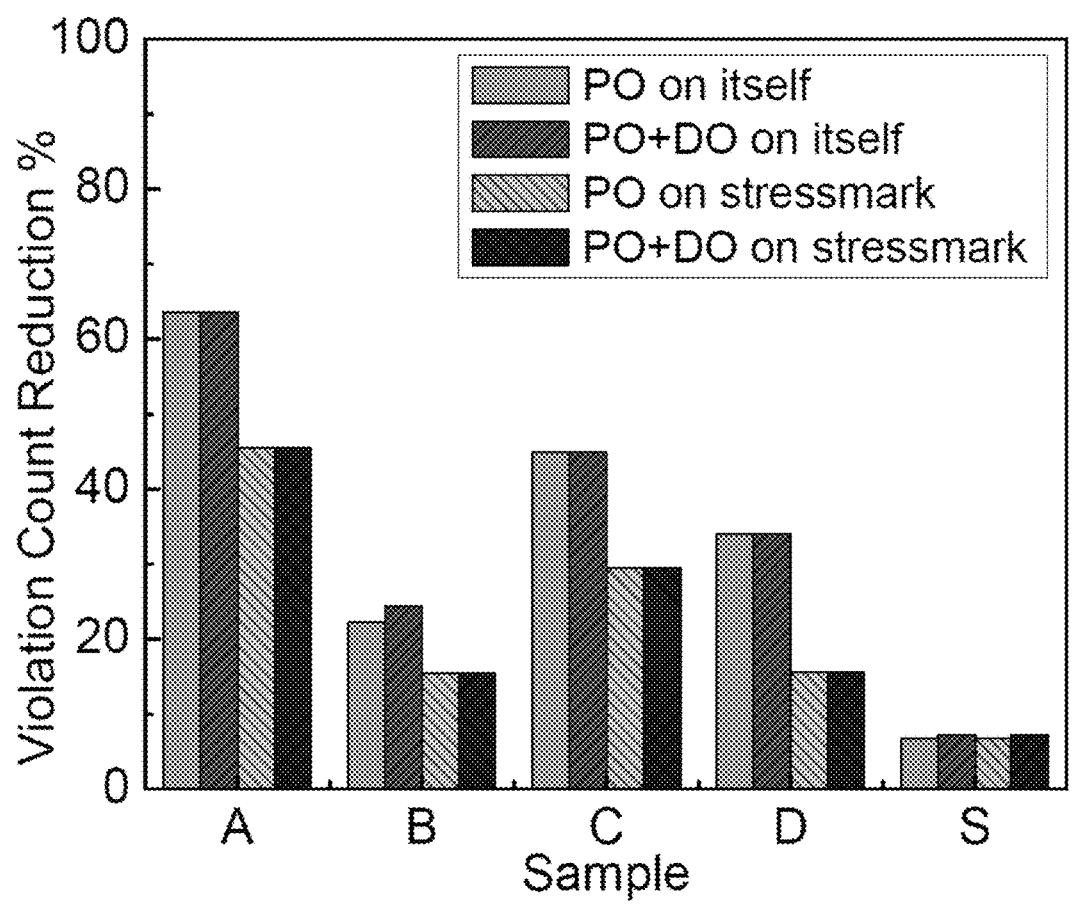
FIG. 12 illustrates effect of transient optimization on violation count with 507 VDD power pads and 507 GND power pads in accordance with some embodiments.
Figure 13:
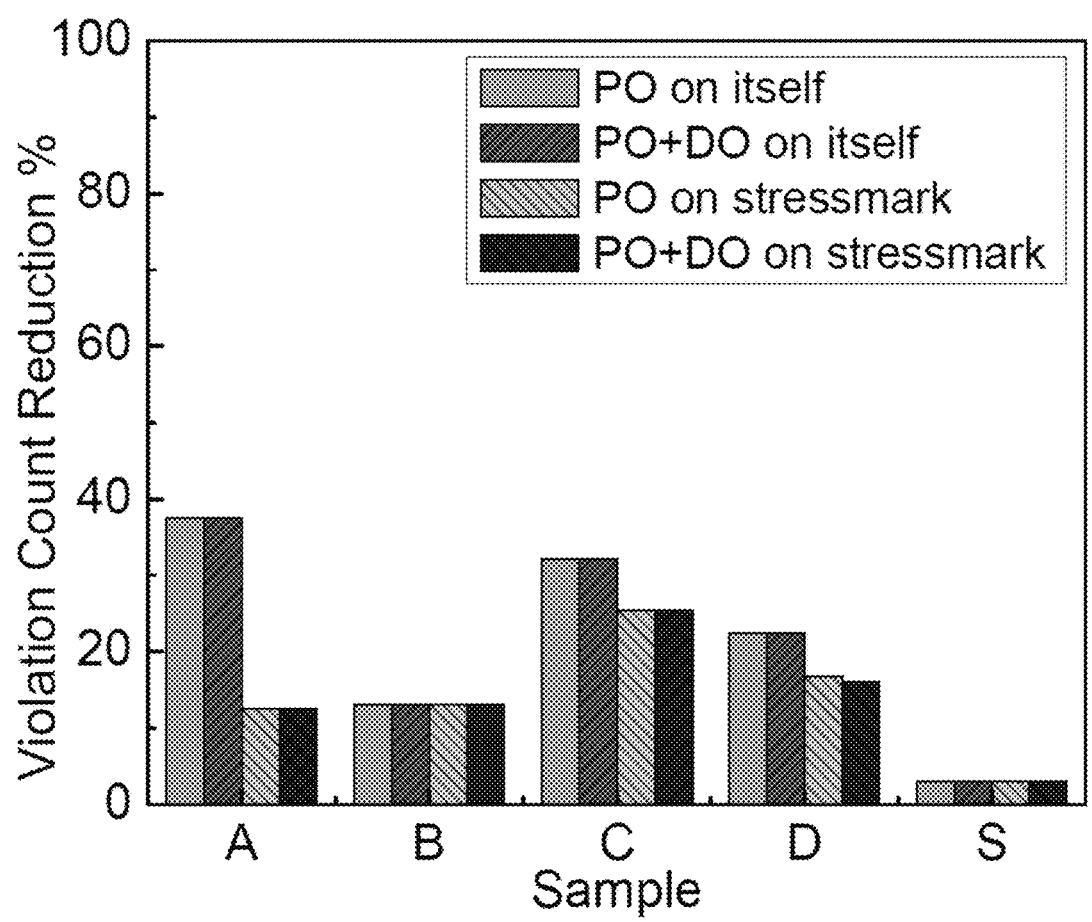
FIG. 13 illustrates effect of transient optimization on violation count with 627 VDD power pads and 627 GND power pads in accordance with some embodiments.
Figure 14:
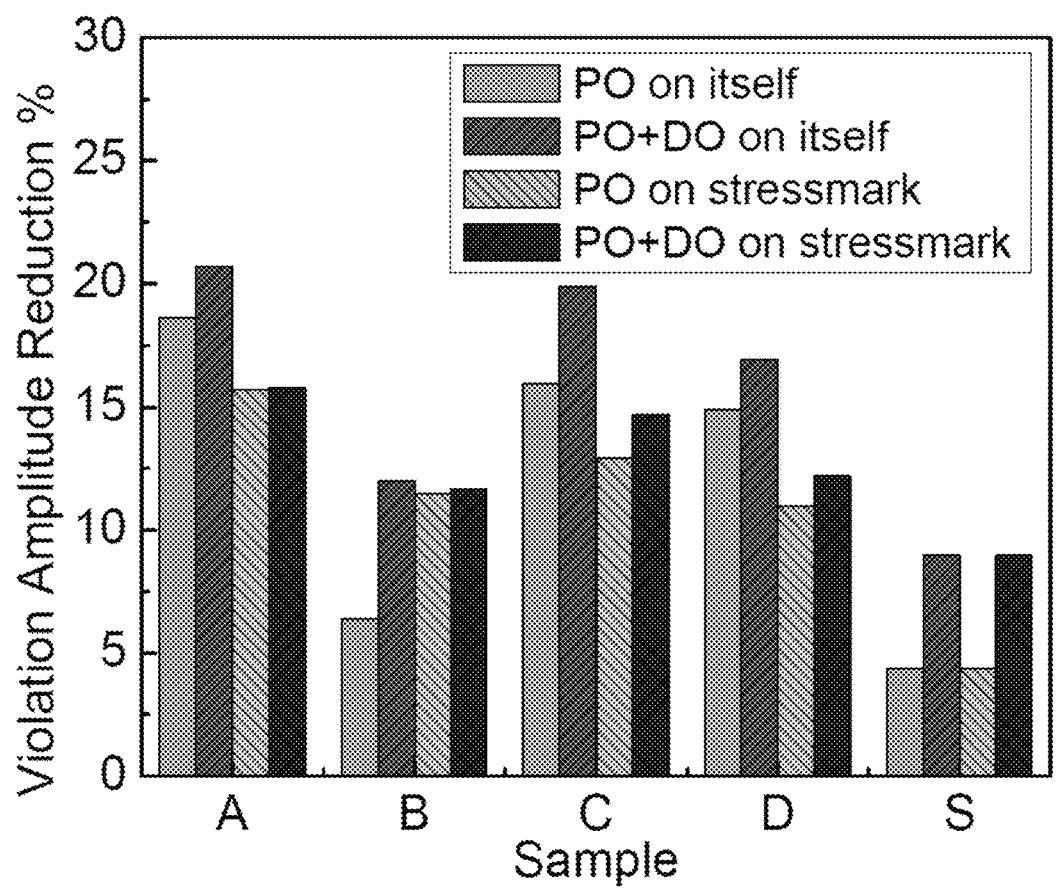
FIG. 14 illustrates effect of transient optimization on maximum violation amplitude with 267 VDD power pads and 267 GND power pads in accordance with some embodiments.
Figure 15:
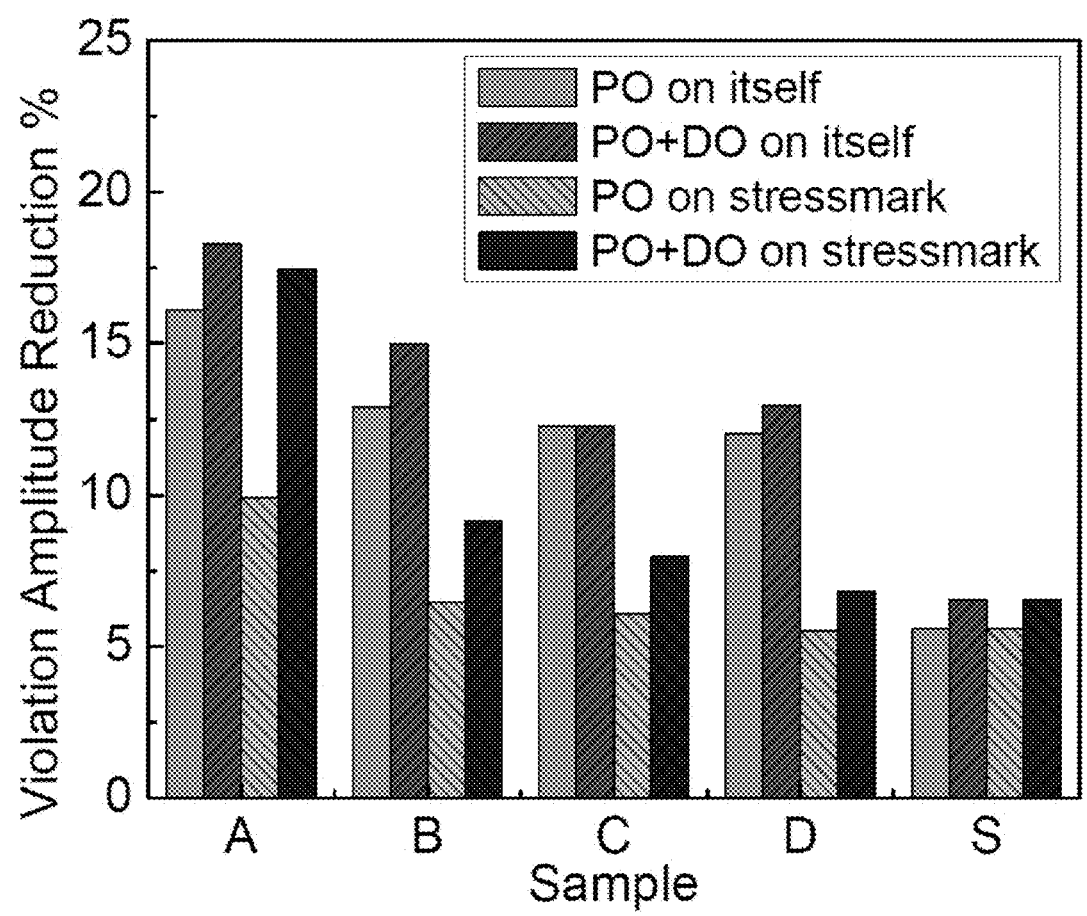
FIG. 15 illustrates effect of transient optimization on maximum violation amplitude with 387 VDD power pads and 387 GND power pads in accordance with some embodiments.
Figure 16:
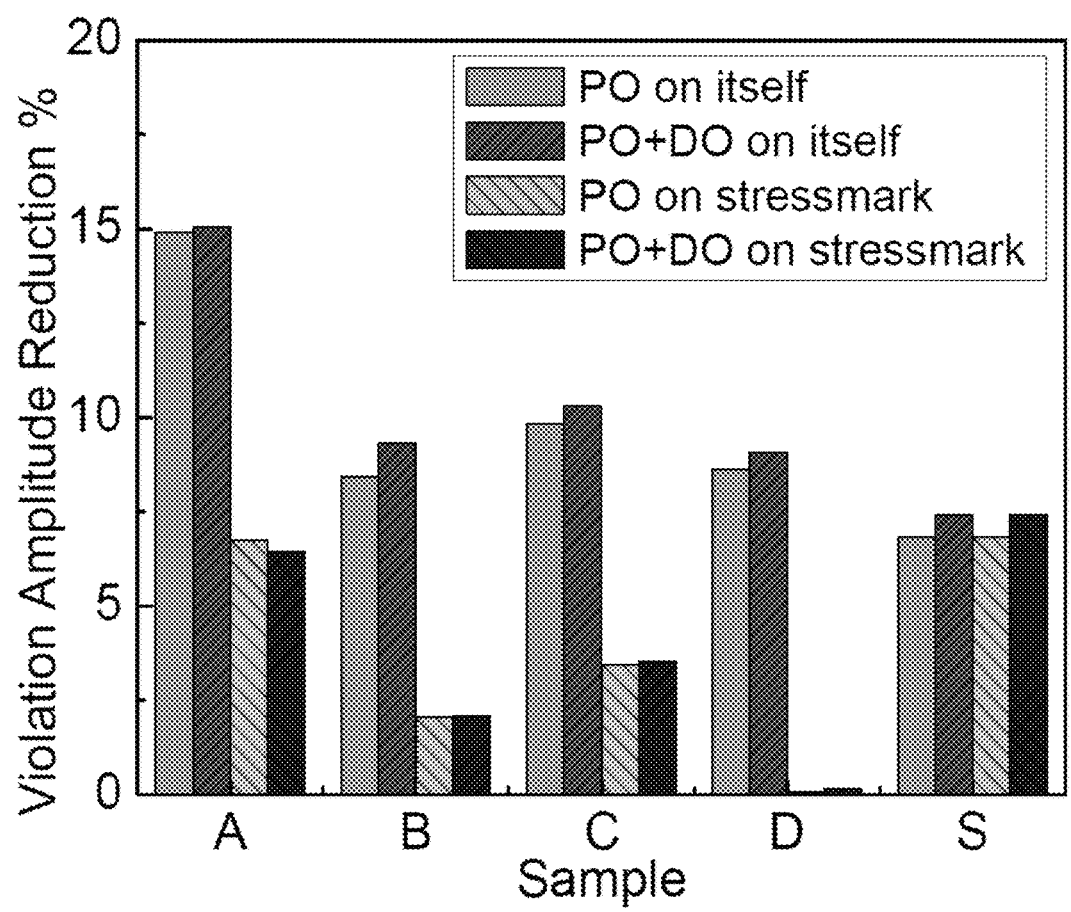
FIG. 16 illustrates effect of transient optimization on maximum violation amplitude with 507 VDD power pads and 507 GND power pads in accordance with some embodiments.
Figure 17:
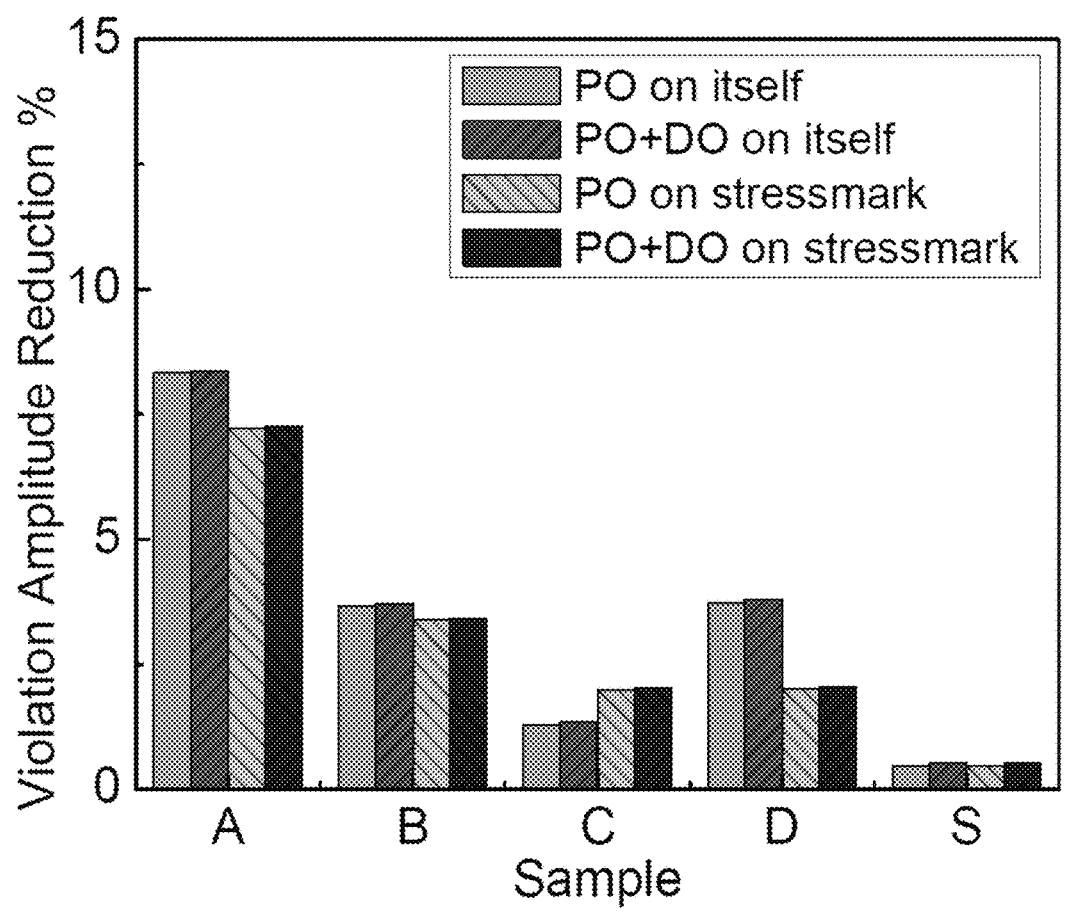
FIG. 17 illustrates effect of transient optimization on maximum violation amplitude with 627 VDD power pads and 627 GND power pads in accordance with some embodiments.

FIG. 9 illustrates computation time comparison between simulated annealing and the algorithms (PO and DO). The IR-targeted SA technique (Document 19) is extended for transient noise optimization by adopting a cooling rate of 0.90 and using violation count as the objective function; it executed 13884 iterations, repairing 9.6 days, to reduce the violation count from 522 (randomly initialized pad location) to 305 (FIG. 9). The PO approach, on the other hand, required only 78 iterations, 178 minutes, to reach the violation count of 286 from the same initial pad placement. PO+DO reached 279 violations in 284 minutes. To achieve the same quality as WP methods, SA needs to further slow its cooling speed, requiring significantly more computation (estimated at 5× or 48 days; Document 14). Increases in pad count exacerbate this performance penalty. Consequently, all remaining comparisons are made against the more practical IR-drop-based SA.

Comparison of Transient Noise Suppression With Other Technique

The present inventors evaluated how many voltage violations can be reduced by the technique described in this disclosure of aspects of an embodiment of the present invention on applicable benchmarks. When the present inventors optimize pad placement using the technique described in this disclosure, voltage violations are reduced 46-80% across 11 Parsec benchmarks with respect to the results from state-of-the-are IR-drop-optimized pad placement.

A. Transient-v. IR-Optimized Placement on a Single Program Segment

The first simulations compare the effectiveness of IR-drop-optimizing pad placement method and the Walking Pads transient optimization method on transient noise control. In these simulations, a uniform distribution of on-chip decoupling, capacitance is assumed. Four samples are randomly selected among all the samples from the 11 Parsec benchmarks: A, B, C, D. The sample with highest violation amplitude, across all benchmarks is identified, and this sample is denoted as the stressmark S.

The violation cycle counts are 26, 97, 159, 271, and 326, for these five samples when 267 VDD and 267 GND pads are optimized for IR-drop. FIGS. 10-13 show reduction in violation cycle count achieved by WP across the five samples with respect to the IR-drop-optimized placement. "PO on itself" indicates the effectiveness of training and evaluating PO using the sample in question. "PO on stressmark" indicates the effectiveness of training PO using S and then evaluating PO using the sample in question. PO can reduce violations by up to 80% after 178 iterations.

Under PO+DO, DO is terminated after 0.2·N iterations where N is the total number of power supply pads allocated, both VDD and GND. These additional iterations reduce violations up to 7% when compared with PO results.

FIGS. 14-17 show the reduction in the maximum violation noise amplitude achieved by WP with respect to the IR-drop-optimized placement. PO and PO+DO reduce the maximum violation amplitude by up to 18.6% and 20.7%.

Optimizing pad placement for transient noise clearly reduces both the number of voltage violation count and their magnitude, but it does so at the expense of steady-state IR drop; transient-optimized pad placement results in an increase of up to 1.3% of the worst IP drop on the IR-drop stressmark compared with IR-drop-optimized pad placement in study cases. However, this is ultimately of little consequence: steady-state IR-drop is clearly a poor proxy tor transient noise, the mitigation of which requires direct optimization. It is noted that transient noise combines the effects of all sources of noise, including IR drop.

It is observed in FIGS. 10-17 that optimizing pad placement by training with the stressmark S significantly reduces the violation count and amplitude not only for S, but also for other samples. This indicates the feasibility of training on one representative sample to reduce noise violations across a variety of samples.

B. Transient-v. IR-Optimized Placement on Whole Benchmark Programs

Figure 18:
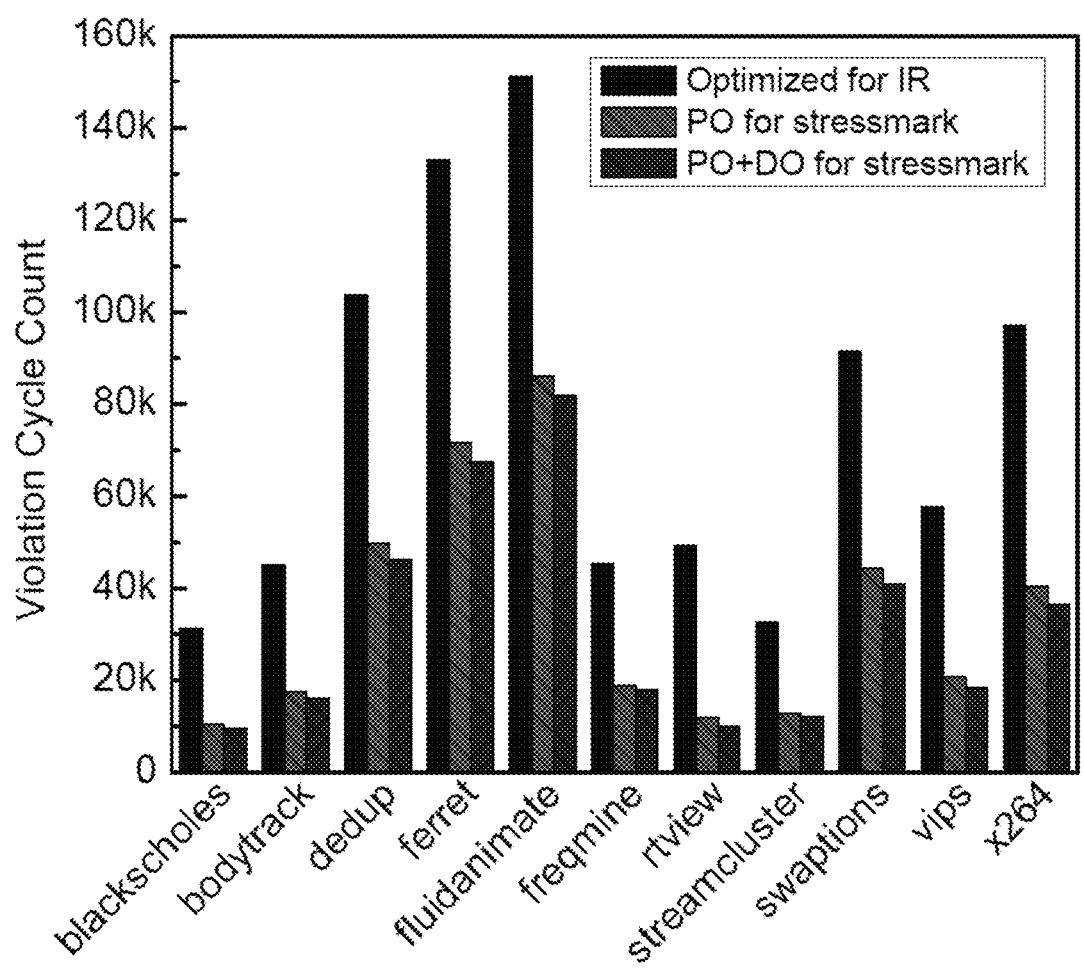
FIG. 18 illustrates violation-cycle reduction by transient optimization in accordance with some embodiments. The pad count is 267 for VDD/GND. The pad locations are optimized on stressmark. The violation cycles for each benchmark are counted over all samples (IM cycles in total).

Next, the effect that training on such a stressmark has is explored when evaluating the noise across complete benchmarks. FIG. 18 shows the resulting violation count reduction for the 11 benchmarks in the Parsec suite. A 46% (fluidanimate) to 80% (rtview) reduction in violation count is achieved when pad placement is optimized based on the transient stressmark, compared with the results from the IR-optimized placement. Clearly, transient pad optimization using a representative sample can help to reduce the violation count of a whole benchmark significantly. It is further observed that PO+DO always performs better than PO, by 3% on average.

Table 1 details our optimization results for the benchmark Blackscholes. For each combination of pad count (Pads) and optimization algorithm (Alg.), Table 1 reports the number of violations (Vio. Count), average violation amplitude (Ave. Amp. %) and maximum violation amplitude (Max Amp. %). It is observed that our transient-based optimization reduces the violation count significantly for all tested pad counts. Furthermore, the transient-based optimization algorithms also reduce the average and maximum violation amplitude, which are used to perform voltage margin assignment for some runtime control techniques (Documents 9 and 17).

TABLE 1

Optimization Results for Blackholes

| Pads | Alg. | Vio. Count | Ave. Amp. % | Max Amp. % |
|---|---|---|---|---|
| 267 | IR | 31234 | 6.404 | 8.961 |
| 267 | PO + DO | 9643 | 5.562 | 7.644 |
| 387 | IR | 11807 | 5.770 | 8.435 |
| 387 | PO + DO | 5160 | 5.221 | 7.620 |
| 507 | IR | 6291 | 5.406 | 7.982 |
| 507 | PO + DO | 4143 | 5.125 | 7.673 |
| 627 | IR | 4373 | 5.184 | 7.890 |
| 627 | PO + DO | 2940 | 4.925 | 7.580 |

C. Decap Effect on Optimal Pad Location

This subsection shows the proposed method can optimize pad location according to a given decap (decoupling capacitor) allocation. The effect of decap is not able to be captured by the traditional placement optimization technique based on processor's steady state behavior.

Figure 19:
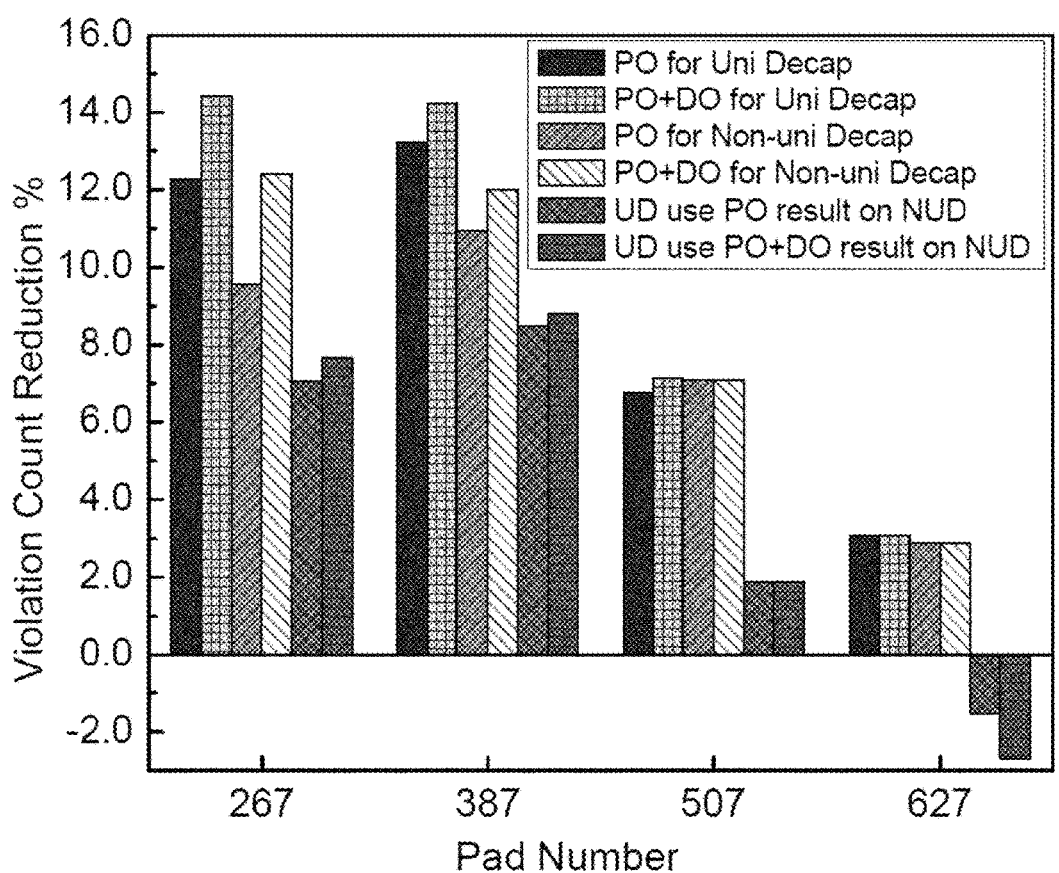
FIG. 19 illustrates decap elect on optimal pad locations in accordance with some embodiments. The stressmark sample is used for this figure. Here, "PO/PO+DO for Uni/Non-uni Decap" means optimizing and evaluating the results on the same decap configuration. "UD use PO/PO+DO on NUD" means optimizing pad location with non-uniform decap and evaluating the results with uniform decap.

To show the effect of decoupling capacitance allocation on optimal pad location, further simulations are performed using a non-uniform decap allocation. As the ALU of each core is a transient noise hotspot, the total on-chip decap is divided by 16 and ¹⁄₁₆th of the decap is placed as close to the ALU of each of the 16 cores as possible. Then, IR-drop and stressmark-based transient pad optimization are compared. FIG. 19 shows the reduction in violation counts in the stressmark produced by transient optimization for (a) uniform decap (Uni Decap) distribution, (b) non-uniform decap (Non-uni Decap), and (c) pad placement assuming a non-uniform distribution but applied to a scenario with uniform distribution. It is observed that the distribution of decoupling capacitance affects the optimized pad placement: when pad placement is optimized for one case (e.g., non-uniform distribution) but then applied to another (e.g., uniform distribution), the reduction in violations shrinks significantly. The data for 627 pads show that violations may get worse under deep optimization on another decap configuration. In some cases, a change of decap allocation may even make the transient-optimized pad placement worse than the IR-optimized pad placement; joint pad placement and decap allocation optimization is clearly needed. The above discussion in the subsection shows another evidence that the proposed optimization framework can capture and carry out optimization according to the transient behavior of the target system.

Illustrative Implementation

Figure 20:
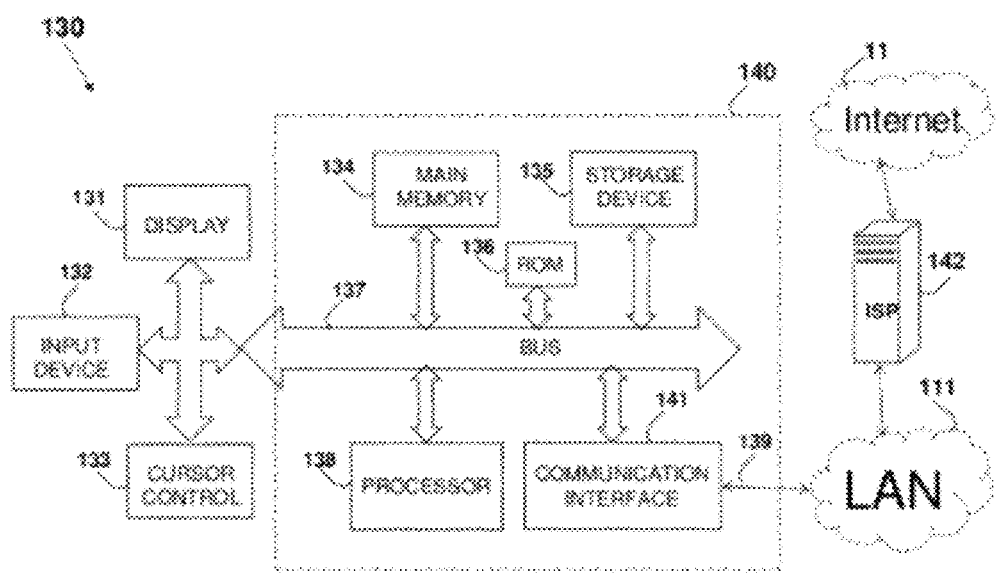
FIG. 20 is a block diagram that illustrates a system including a computer system and the associated Internet connection upon which an embodiment, or a portion thereof, may be implemented.

FIG. 20 is a block diagram that illustrates a system 130 including a computer system 140 and the associated Internet 11 connection upon which an embodiment, or a portion thereof, may be implemented. Such configuration is typically used for computers (hosts) connected to the Internet 11 and executing a server or a client (or a combination) software. A source computer such as laptop, so ultimate destination computer and relay servers, for example, as well as any computer or processor described herein, may use the computer system configuration and the Internet connection shown in FIG. 20. The system 140 may be used as a portable electronic device such as a notebook/laptop computer, a media player (e.g., MP3 based or video player), a cellular phone, a Personal Digital Assistant (PDA), an image processing device (e.g., a digital camera or video recorder), and/or any other handheld computing devices, or a combination of any of these devices. Note that while FIG. 20 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used. The computer system of FIG. 20 may, for example, be an Apple Macintosh computer or Power Book, or an IBM compatible PC. Computer system 140 includes a bus 137, an interconnect, or other communication mechanism for communicating information, and a processor 138, commonly in the form of an integrated circuit, coupled with bus 137 for processing information and for executing the computer executable instructions. Computer system 140 also includes a main memory 134, such as a Random Access Memory (RAM) or other dynamic storage device, coupled to bus 137 for storing information and instructions to be executed by processor 138.

Main memory 134 also may be used for storing temporary variables or other intermediate information during execution of instructions to be executed by processor 138. Computer system 140 further includes a Read Only Memory (ROM) 136 (or other non-volatile memory) or other static storage device coupled to bus 137 for storing static information and instructions for processor 138. A storage device 135, such as a magnetic disk or optical disk, a hard disk drive for reading from and writing to a hard disk, a magnetic disk drive for reading from and writing to a magnetic disk, and/or an optical disk drive (such as DVD) for reading from and writing to a removable optical disk, is coupled to bus 137 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically computer system 140 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is meant to include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Futhermore, various functional aspects of the processor may be implemented solely as software or firmware associated with the processor.

Computer system 140 may be coupled via bus 137 to a display 131, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display allows a user to view, enter, and/or edit information that is relevant to the operation of the system. An input device 132, including alphanumeric and other keys, is coupled to bus 137 for communicating information and command selections to processor 138. Another type of user input device is cursor control 133, such as a mouse, a trackball, or cursor direction keys for communicating direction information and command selections to processor 138 and for controlling cursor movement on display 131. This input device typically has two degrees of freedom in two axes, a first axis (e.g., x) and a second axis (e.g., y), that allows the device to specify positions in a plane.

The computer system 140 may be used for implementing the methods and techniques described herein. According to one embodiment, those methods and techniques are performed by computer system 140 in response to processor 138 executing one or more sequences of one or more instructions contained in main memory 134. Such instructions may be read into main memory 134 from another computer-readable medium, such as storage device 135. Execution of the sequences of instructions contained in main memory 134 causes processor 138 to perform the process steps described herein. In alternative embodiments, hard-wired circuitry may be used in place of or in combination with software instructions to implement the arrangement. Thus, embodiments of the invention are not limited to any .specific combination of hardware circuitry and software.

The term "computer-readable medium" (or "machine-readable medium") as used herein is an extensible term that refers to any medium or any memory, that participates in providing instructions to a processor, (such as processor 138) for execution, for any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise bus 137. Transmission media can also take the form of acoustic or light waves, such as those generated, during radio-wave and infrared data communications, or other form of propagated signals (e.g., carrier waves, infrared signals, digital signals, etc.). Common forms of computer-readable media include, for example; a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 138 for execution. For example, the instructions may initially be carried on a magnetic disk of a remote computer. The remote computer can load the instructions into its dynamic memory and send the instructions over a telephone line using a modem. A modem local to computer system 146 can receive the data on the telephone line and use a infra-red transmitter to convert the data to an infra-red signal. An infra-red detector can receive the data carried in the infra-red signal and appropriate circuitry can place the data on bus 137. Bus 137 carries the data to main memory 134, from which processor 138 retrieves and executes the instructions. The instructions received by main memory 134 may optionally be stored on storage device 135 either before or after execution by processor 138.

Computer system 140 also includes a communication interface 141 coupled to bus 137. Communication interface 141 provides a two-way data communication coupling to a network link 139 that is connected to a local network 111. for example, communication interface 141 may be an Integrated Services Digital Network (ISDN) card or a modem to provide a data communication connection to a corresponding type of telephone line. As another non-limiting example, communication interface 141 may be a local area network (LAN) card to provide a data communication connection to a compatible LAN. For example, Ethernet based connection based on IEEE802.3 standard may be used such as 10/100BaseT, 1000BaseT (gigabit Ethernet), 10 gigabit Ethernet (10 GE or 10 GbE or 10 GigE per IEEE Std 802.3ae-2002 as standard), 40 Gigabit Ethernet (40 GbE), or 100 Gigabit Ethernet (100 GbE as per Ethernet standard IEEE P802.3ba), as described in Cisco Systems, Inc. Publication number 1-587005-001-3 (6/99), "Internetworking Technologies Handbook", Chapter 7: "Ethernet Technologies", pages 7-1 to 7-38, which is incorporated in its entirety for all purposes as if fully set forth herein. In such a case, the communication interface 141 typically include a LAN transceiver or a modem, such as Standard Microsystems Corporation (SMSC) LAN91C111 10/100 Ethernet transceiver described in the Standard Microsystems Corporation (SMSC) data-sheer "LAN91C111 10/100 Non-PCI Ethernet Single Chip MAC+PHY" Data-Sheet, Rev. 15 (Feb. 20, 2004), which is incorporated in its entirety for all purposes as if fully set forth herein.

Wireless links may also be implemented. In any such implementation, communication interface 141 sends and receives electrical, electromagnetic or optical signals that carry digital data streams representing various types of information.

Network link 139 typically provides data communication through one or more networks to other data devices. For example, network link 139 may provide a connection through local network 111 to a host computer or to data equipment operated by an Internet Service Provider (ISP) 142. ISP 142 in turn provides data communication services through the world wide packet data communication network internet 11. Local network 111 and Internet 11 both use electrical, electromagnetic or optical signals that carry digital data streams. The signals through the various networks and the signals on the network link 139 and through the communication interface 141, which carry the digital data to and from computer system 140, are exemplary forms of carrier waves transporting the information.

A received code may be executed by processor 138 as it is received, and/or stored in storage device 135, or other non-volatile storage for later execution. In this manner, computer system 140 may obtain application code in the form of a carrier wave.

Accordingly, an aspect of an embodiment provides, but not limited thereto, a system, method, and computer readable medium, for power pad placement of power delivery networks (PDN), which is important in, for example, computer-automated-design (CAD) of integrated circuits, and more particularly, the optimization of power pad locations and transient noise control. It should be appreciated that the related optimization system and method and the related networks, computer systems, internet, and components and functions may be implemented according to the scheme(s) disclosed herein.

Figure 21:
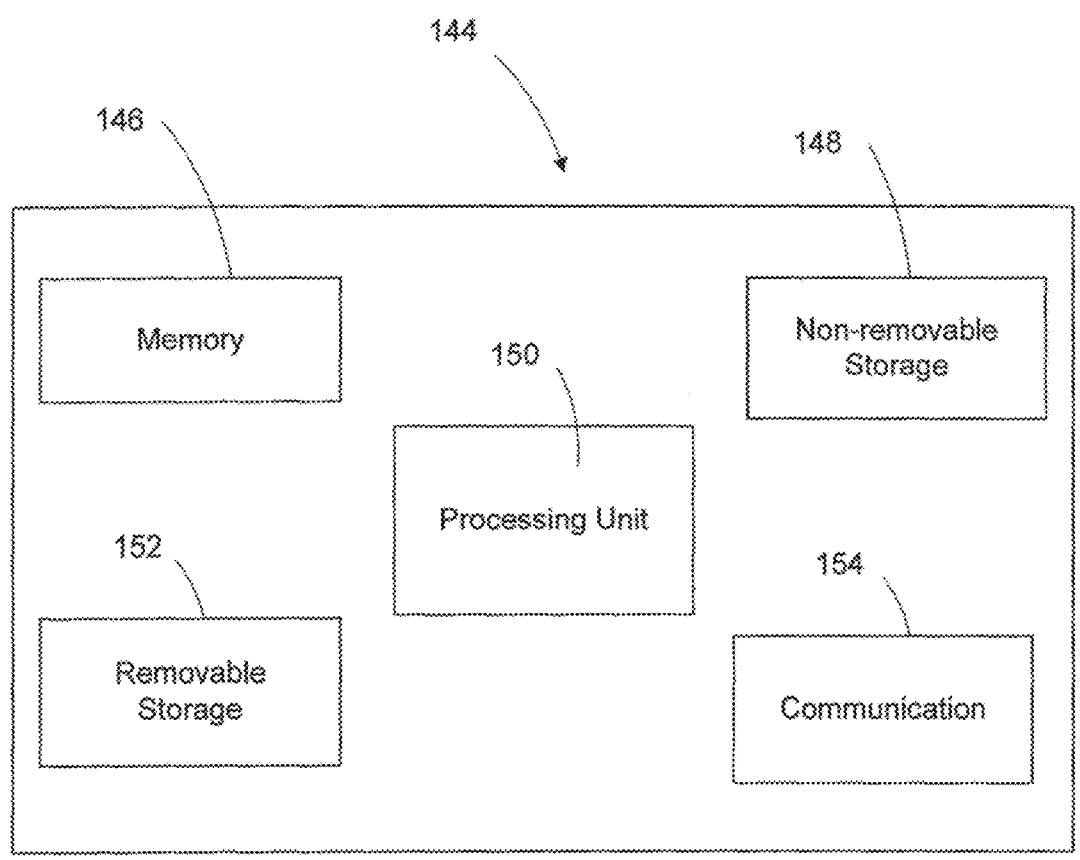
FIGS. 21 and 22 illustrate an exemplary computing device in which an embodiment of the invention, or a portion thereof, can be implemented.
Figure 22:
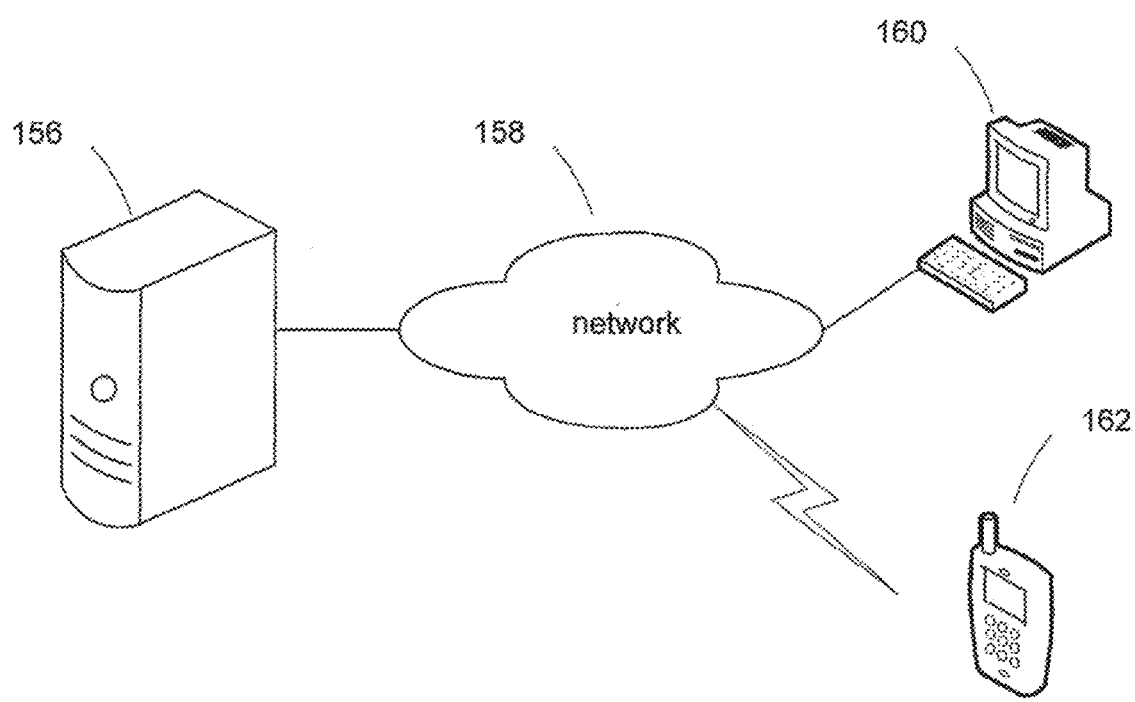

Various embodiments or aspects of the invention, for example, can be implemented as software in a computing device, or alternatively, on hardware. An exemplary computing device in which an embodiment of the invention, or a portion thereof, can be implemented is schematically illustrated in FIGS. 21 and 22. Although some aspects may be known, a brief explanation will be provided herein tor the convenience of other readers.

Referring to FIG. 21, in its most basic configuration, computing device 144 typically includes at least one processing unit 150 and memory 146. Depending on the exact configuration and type of computing device, memory 146 can be volatile (such as RAM), non-volatile (such as ROM, flash memory, etc.) or some combination of the two.

Additionally, device 144 may also have other features and/or functionality. For example, the device could also include additional removable and/or non-removable storage including, not limited to, magnetic or optical disks or tape, as well as writable electrical storage media. Such additional storage is the figure by removable storage 152 and non-removable storage 148. Computer storage media includes volatile and nonvolatile, removable and non-removable media implemented in any method or technology for storage of information such as computer readable instructions, data structures, program modules or other data. The memory, the removable storage and the non-removable storage are all examples of computer storage media. Computer storage media includes, but is not limned to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device. Any such computer storage media may be part of, or used in conjunction with, the device.

The device may also contain one or more communications connections 154 that allow the device to communicate with other devices (e.g. other computing devices). The communications connections carry information in a communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode, execute, or process information in the signal. By way of example, and not limitation, communication medium includes wired media such as a wired network or direct-wired connection, and wireless media such as radio, RF, infrared and other wireless media. As discussed above, the term computer readable media as used herein includes both storage media and communication media.

In addition to a stand-alone computing machine, embodiments of the invention can also be implemented on a network system comprising a plurality of computing devices that are in communication with a networking means, such as a network, with an infrastructure or an ad hoc network. The network connection can be wired connections or wireless connections. As a way of example, FIG. 22 illustrates a network system in which embodiments of the invention can be implemented. In this example, the network system comprises computer 156 (e.g. a network server), network connection means 158 (e.g. wired and/or wireless connections), computer terminal 160, and PDA (e.g. a smart-phone) 162 (or other handheld or portable device, such as a cell phone, laptop computer, tablet computer, GPS receiver, mp3 player, handheld video player, pocket projector, etc, or handheld devices (or non portable devices) with combinations of such features). The embodiments of the invention can be implemented in anyone of the devices of the system. For example, execution of the instructions or other desired processing can be performed on the same computing device that is anyone of 156, 160, and 162. Alternatively, an embodiment of the invention can be performed on different computing devices of the network system. For example, certain desired or required processing or execution can be performed on one of the computing devices of the network (e.g. server 156), whereas other processing and execution of the instruction can be performed at another computing device (e.g. terminal 160) of the network system, or vice versa. In fact, certain processing or execution can be performed at one computing device (e.g. server 156); and the other processing or execution of the instructions can be performed at different computing devices that may or may not be networked. For example, the certain processing can be performed at terminal 160, while the other processing or instructions are passed to device 162 where the instructions are executed. This scenario may be of particular value especially when the PDA device, for example, accesses to the network through computer terminal 160 (or an access point in an ad hoc network). For another example, software to be protected can be executed, encoded or processed with one or more embodiments of the invention. The processed, encoded or executed software can then be distributed to customers. The distribution can be in a form of storage media (e.g. disk) or electronic copy.

Practice of an aspect of an embodiment (or embodiments) of the invention is presented herein for illustration only and should not be construed as limiting the invention in any way.

An approach of the present invention systems and designs and optimization system and techniques may be based on the tools, programs and operating systems as discussed throughout this disclosure, such techniques can be applied to various hardwire, tools, operating systems, virtual machine, PVM, or executable format.

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A non-transitory computer readable medium storing a program causing a computer to execute an optimization process of placing a plurality of electrical units for transient voltage and temperature control on an electronic device, the optimization process comprising:
    gathering information of physical quantities from a physical transient voltage simulation on the electronic device;
    observing the physical quantities in a plurality of program execution segments in a time domain or a frequency domain;
    translating transient information of the physical quantities into metrics of local instability by averaging the physical quantities over a period of time of a program execution or over a range of frequency; and
    employing a placement method for the plurality of electrical units on the electronic device based on a virtual force,
    wherein the virtual force is a vector in a direction of a total averaged physical quantities observed by a given electrical unit,
    wherein the placement method converts a global optimization problem of power supply or temperature stability problem to a local balance problem of equalizing local virtual force imposed on the electrical unit,
    wherein the placement method allows one or more electrical units on the electronic device to step toward their optimized positions simultaneously, and
    wherein the virtual force for the given electrical unit in one direction is calculated by averaging voltage gradient on a connected wire from that direction over all simulation cycles of target power trace.

2. The non-transitory computer readable medium according to claim 1, wherein
    the physical quantities include current, resistive voltage drops, reactive voltage drops, a summation of the resistive voltage drops and the reactive voltage drops, spatial gradients of the resistive voltage drops, spatial gradients of the reactive voltage drops, heat fluxes, local temperature changes, and spatial temperature gradients.

3. An optimizing apparatus, for executing an optimization process of placing a plurality of electrical units for transient voltage and temperature control on an electronic device, the optimization apparatus comprising:
    a processor configured to:
        gather information of physical quantities from a physical transient voltage simulation on the electronic device;
        observe the physical quantities in a plurality of program execution segments in a time domain or a frequency domain;
        translate transient information of the physical quantities into metrics of local instability by averaging the physical quantities over a period of time of a program execution or over a range of frequency; and
        employ a placement method for the plurality of electrical units on the electronic device based on a virtual force,
    wherein the virtual force is a vector in a direction of a total averaged physical quantities observed by a given electrical unit,
    wherein the placement method converts a global optimization problem of power supply or temperature stability problem to a local balance problem of equalizing local virtual force imposed on the electrical unit,
    wherein the placement method allows one or more electrical units on the electronic device to step toward their optimized positions simultaneously, and
    wherein the virtual force for the given electrical unit in one direction is calculated by averaging voltage gradient on a connected wire from that direction over all simulation cycles of target power trace.

4. The optimizing apparatus according to claim 3, wherein
    the physical quantities include current, resistive voltage drops, reactive voltage drops, a summation of the resistive voltage drops and the reactive voltage drops, spatial gradients of the resistive voltage drops, spatial gradients of the reactive voltage drops, heat fluxes, local temperature changes, and spatial temperature gradients.

5. A non-transitory computer readable medium storing a program causing a computer to execute an optimization process of placing a plurality of power pads for transient voltage and temperature control on power delivery grids, the optimization process comprising:
    implementing a statistical sampling method for generating samples from execution traces of real-world benchmarks;
    selecting a representative execution segment as an input of the optimization process; and
    converting a global optimization process of a pad placement for minimizing a transient violation count to a local balance problem of equalizing transient noise metrics on wires connected to the power pad,
    wherein the transient noise metrics are obtained by averaging voltage noise crossing the representative execution segment, wherein the converting to the local balance problem includes employing a placement method for the plurality of power pads based on a virtual force, and the virtual force is a vector in a direction of a total average voltage noise observed by a given power pad, wherein the placement method allows one or more power pads to step toward their optimized locations on the power delivery grids simultaneously, and wherein the virtual force for the given electrical unit in one direction is calculated by averaging voltage gradient on a connected wire from that direction over all simulation cycles of target power trace.

6. An optimizing apparatus, for executing an optimization process of placing a plurality of power pads for transient voltage and temperature control on power delivery grids, the optimization apparatus comprising:

a processor configured to:
implement a statistical sampling method for generating samples from execution traces of real-world benchmarks;
select a representative execution segment as an input of the optimization process; and
convert a global optimization process of a pad placement for minimizing a transient violation count to a local balance problem of equalizing transient noise metrics on wires connected to the power pad, wherein the transient noise metrics are obtained by averaging voltage noise crossing the representative execution segment, wherein the converting to the local balance problem includes employing a placement method for the plurality of power pads based on a virtual force, and the virtual force is a vector in a direction of a total average voltage noise observed by a given power pad, wherein the placement method allows one or more power pads to step toward their optimized locations on the power delivery grids simultaneously, and wherein the virtual force for the given electrical unit in one direction is calculated by averaging voltage gradient on a connected wire from that direction over all simulation cycles of target power trace.

* * * * *